US011212786B2

(12) United States Patent
Hosseini et al.

(10) Patent No.: US 11,212,786 B2
(45) Date of Patent: Dec. 28, 2021

(54) SERVICE AND FORMAT INDICATION TECHNIQUES FOR DOWNLINK CONTROL INFORMATION

(71) Applicant: QUALCOMM Incorporated, San Diego, CA (US)

(72) Inventors: Seyedkianoush Hosseini, San Diego, CA (US); Gabi Sarkis, San Diego, CA (US); Wei Yang, San Diego, CA (US); Chih-Ping Li, San Diego, CA (US); Heechoon Lee, San Diego, CA (US); Jing Jiang, San Diego, CA (US); Peter Gaal, San Diego, CA (US); Wanshi Chen, San Diego, CA (US); Linhai He, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/405,817

(22) Filed: May 7, 2019

(65) Prior Publication Data
US 2019/0349897 A1 Nov. 14, 2019

Related U.S. Application Data

(60) Provisional application No. 62/669,341, filed on May 9, 2018.

(51) Int. Cl.
*H04W 72/04* (2009.01)
*H04W 28/12* (2009.01)
*H04W 72/12* (2009.01)

(52) U.S. Cl.
CPC ......... *H04W 72/042* (2013.01); *H04W 28/12* (2013.01); *H04W 72/048* (2013.01); *H04W 72/1242* (2013.01); *H04W 72/1268* (2013.01)

(58) Field of Classification Search
CPC . H04W 72/042; H04W 28/12; H04W 72/048; H04W 72/1242; H04W 72/1268;
(Continued)

(56) References Cited

U.S. PATENT DOCUMENTS 9,094,165 B2 * 7/2015 Aiba ..................... H04L 5/0094
2004/0005007 A1 * 1/2004 Viscito ................ H04N 21/242
375/240.25
(Continued)

FOREIGN PATENT DOCUMENTS

CN 101932024 A * 12/2010

OTHER PUBLICATIONS

Guangdong Oppo Mobile Telecom: "DL Control Channel Design for URLLC", 3GPP Draft; R1-1704619, 3rd Generation Partnership Project (3GPP), Mobile Competence Centre; 650, Route Des Llucioles; F-06921 Sophia-Antipolis Cedex; France, vol. RAN WG1, No. Spokane, Washington, USA; Apr. 3, 2017-Apr. 7, 2017, Apr. 2, 2017, XP051242758, 4 pages, Retrieved from the Internet: URL: http://www.3gpp.org/ftp/Meetings_3GPP_SYNC/RAN1/Docs/ [retrieved on Apr. 2, 2017].
(Continued)

*Primary Examiner* — Hardikkumar D Patel
(74) *Attorney, Agent, or Firm* — Holland & Hart LLP

(57) ABSTRACT

Methods, systems, and devices for wireless communications are described that provide for service indication via downlink control information (DCI) in which different services have a same DCI size. Techniques provide also that a DCI format may be indicated by a masking operation on a cyclic redundancy check (CRC) of the DCI. The DCI may include an indicator field that may indicate the service of the associated operation. The indication may also be provided via different monitoring occasions of the DCI transmissions that are associated with different services. Different DCI (Continued)

search spaces also may be associated with different services and provide the service indication. Additionally or alternatively, different scrambling sequences used on all or a portion of control information or demodulation reference signal transmissions may be associated with different services.

29 Claims, 18 Drawing Sheets

(58) Field of Classification Search
CPC ..... H04W 76/11; H04W 72/14; H04W 48/12; H04W 8/22; H04W 72/0466; H04W 72/10; H04W 52/34; H04W 52/281; H04W 52/245; H04W 52/367; H04W 72/082; H04W 52/243; H04W 72/0473; H04W 72/0446; H04W 4/70; H04L 5/00; H04L 1/0061; H04L 5/0091; H04L 5/0051; H04L 5/0007; H04L 5/0053; H04L 1/0072; H04L 5/14; H04L 1/0046; H04L 1/1867; H04L 1/0075; H04L 1/0064; H04L 1/0045; H04L 1/0009
See application file for complete search history.

(56) References Cited

U.S. PATENT DOCUMENTS

| | | | | |
|---|---|---|---|---|
| 2013/0194931 A1* | 8/2013 | Lee | ............. | H04W 72/04 370/241 |
| 2014/0185540 A1* | 7/2014 | Gaal | ............. | H04W 72/10 370/329 |
| 2016/0043829 A1* | 2/2016 | Chen | ............. | H03M 13/17 714/776 |
| 2017/0332359 A1 | 11/2017 | Tsai et al. | | |
| 2017/0332386 A1* | 11/2017 | Li | ............. | H04W 72/1242 |
| 2018/0027576 A1* | 1/2018 | Kowalski | ............. | H04W 72/0446 370/329 |
| 2019/0007181 A1* | 1/2019 | Marinier | ............. | H04L 5/0007 |
| 2019/0274032 A1* | 9/2019 | Chatterjee | ............. | H04W 48/12 |
| 2019/0357226 A1* | 11/2019 | Lin | ............. | H04L 69/324 |

OTHER PUBLICATIONS

International Search Report and Written Opinion—PCT/US2019/ 031360—ISA/EPO—dated Jul. 5, 2019.

Samsung: "Slot Reconfiguration for Low Latency in TDD," 3GPP Draft; R1-1715987, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017, Sep. 17, 2017, XP051339446, 6 pages, Retrieved from the Internet: URL: http://www.3gpp.org/ ftp/Meetings_3GPP_SYNC/RAN1/Docs/ [retrieved on Sep. 17, 2017] p. 4, lines 9-26 figure 4.

Sequans Communications: "On Multiplexing of URLLC and eMBB in DL", 3GPP Draft; R1-1708954, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15, 2017-May 19, 2017, May 14, 2017, XP051274126, 6 Pages, Retrieved from the Internet: URL: http:// www.3gpp.org/ftp/Meetings_3GPP_SYNC/RAN1/Docs/ [retrieved on May 14, 2017],sections 1-4; figure 1.

* cited by examiner

SERVICE AND FORMAT INDICATION TECHNIQUES FOR DOWNLINK CONTROL INFORMATION

CROSS REFERENCE

The present Application for Patent claims priority to U.S. Patent Application No. 62/669,341 by Hosseini et al., entitled "SERVICE AND FORMAT INDICATION TECHNIQUES FOR DOWNLINK CONTROL INFORMATION," filed May 9, 2018, assigned to the assignee hereof, and which is expressly incorporated by reference in its entirety herein.

BACKGROUND

The following relates generally to wireless communications, and more specifically to service and format indication techniques for downlink control information.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A wireless multiple-access communications system may include a number of base stations or network access nodes, each simultaneously supporting communication for multiple communication devices, which may be otherwise known as user equipment (UE). In some wireless communications systems, multiple different wireless services may be implemented, and in some cases a UE may be capable of communications using two or more services. For example, some systems may have an ultra-reliability low-latency communication (URLLC) service that has relatively stringent error rates and latency bounds for certain types of communications (e.g., high priority communications), and an enhanced mobile broadband (eMBB) service that has more relaxed error rates and latency bounds (e.g., lower priority and higher data rate communications).

SUMMARY

The described techniques relate to improved methods, systems, devices, and apparatuses that support service and format indication techniques for downlink control transmission. Various described techniques provide for downlink control information (DCI) that indicates a service for an associated operation, and different services have a same DCI size. In some cases, a DCI format may be indicated by a masking operation on a cyclic redundancy check (CRC) of the DCI. In cases where DCI provides a service indication, the DCI may include an indicator field that may indicate the service of the associated operation. In certain cases, different monitoring occasions of the DCI transmissions may be associated with different services. In some cases, different DCI search spaces may be associated with different services. Additionally or alternatively, different scrambling sequences used on all or a portion of control information or demodulation reference signal transmissions may be associated with different services.

In cases where DCI indicates a DCI format, a different mask may be applied to the DCI CRC based on the format of the DCI. Different CRC masks may also be used to provide the service indication. In some cases, uplink data of different services may be multiplexed in an uplink transmission based on a multiplexing configuration. In some cases, data of one service may be multiplexed with data of another service based on a priority associated with the services, a threshold value related to reliability for an uplink transmission, or any combination thereof.

A method of wireless communication is described. The method may include transmitting, from a UE, a signal to a base station that the UE is capable of supporting a first feature set and a second feature set, receiving, from the base station via a DCI transmission, an indication whether an associated operation will be for the first feature set or the second feature set, where DCI associated with the first feature set has a same size as DCI associated with the second feature set, and communicating according to the first feature set or the second feature set based on the indication.

An apparatus for wireless communication is described. The apparatus may include a processor, memory in electronic communication with the processor, and instructions stored in the memory. The instructions may be executable by the processor to cause the apparatus to transmit, from a UE, a signal to a base station that the UE is capable of supporting a first feature set and a second feature set, receive, from the base station via a DCI transmission, an indication whether an associated operation will be for the first feature set or the second feature set, where DCI associated with the first feature set has a same size as DCI associated with the second feature set, and communicate according to the first feature set or the second feature set based on the indication.

Another apparatus for wireless communication is described. The apparatus may include means for transmitting, from a UE, a signal to a base station that the UE is capable of supporting a first feature set and a second feature set, receiving, from the base station via a DCI transmission, an indication whether an associated operation will be for the first feature set or the second feature set, where DCI associated with the first feature set has a same size as DCI associated with the second feature set, and communicating according to the first feature set or the second feature set based on the indication.

A non-transitory computer-readable medium storing code for wireless communication is described. The code may include instructions executable by a processor to transmit, from a UE, a signal to a base station that the UE is capable of supporting a first feature set and a second feature set, receive, from the base station via a DCI transmission, an indication whether an associated operation will be for the first feature set or the second feature set, where DCI associated with the first feature set has a same size as DCI associated with the second feature set, and communicate according to the first feature set or the second feature set based on the indication.

In some examples of the method, apparatuses, and non-transitory computer-readable medium described herein, the first feature set includes a first service and the second feature set includes a second service.

In some examples of the method, apparatuses, and non-transitory computer-readable medium described herein, the first service and the second service may have different reliability targets, different latency targets, different feedback acknowledgment timelines, different shared channel scheduling timelines, different CSI reporting timelines, different target block error rates (BLER) for CSI computation, or any combination thereof.

In some examples of the method, apparatuses, and non-transitory computer-readable medium described herein, the first service may be an ultra-reliable low-latency communication (URLLC) service and the second service may be an enhanced mobile broadband (eMBB) service.

In some examples of the method, apparatuses, and non-transitory computer-readable medium described herein, the first service and the second service may have separate RRC configurations for uplink transmission, downlink semi-persistent scheduling (SPS) transmissions, or combinations thereof.

In some examples of the method, apparatuses, and non-transitory computer-readable medium described herein, the RRC configurations for uplink transmissions include a grant Type 1 configuration, a grant Type 2 configuration, or combinations thereof.

Some examples of the method, apparatuses, and non-transitory computer-readable medium described herein may further include operations, features, means, or instructions for receiving, from the base station via radio resource configuration (RRC) signaling, a DCI configuration for the first feature set and the second feature set.

In some examples of the method, apparatuses, and non-transitory computer-readable medium described herein, the DCI transmission includes an indication field having a value that indicates whether the associated operation will be for the first feature set or the second feature set.

In some examples of the method, apparatuses, and non-transitory computer-readable medium described herein, the indication field may be a one bit indicator.

Some examples of the method, apparatuses, and non-transitory computer-readable medium described herein may further include operations, features, means, or instructions for receiving, from the base station, a DCI configuration that semi-statically configures for UE to monitor for the indication field.

In some examples of the method, apparatuses, and non-transitory computer-readable medium described herein, a first subset of occasions for monitoring for DCI may be in a UE-specific search space and a second subset of occasions for monitoring for DCI may be in a common search space, and where the indication field may be configured for DCI transmissions in the UE-specific search space, and where DCI transmissions in the common search space may be associated only with one of the first feature set or the second feature set and do not include the indication field.

In some examples of the method, apparatuses, and non-transitory computer-readable medium described herein, the UE monitors for DCI in a set of monitoring occasions and DCI transmissions that include the indication field may be configured in a first subset of monitoring occasions, and where other DCI transmissions outside of the first subset of monitoring occasions may be associated only with one of the first feature set or the second feature set and do not include the indication field.

In some examples of the method, apparatuses, and non-transitory computer-readable medium described herein, the receiving may include operations, features, means, or instructions for monitoring for DCI in a set of monitoring occasions, and where the indication whether the associated operation may be for the first feature set or the second feature set may be based on whether the DCI transmission may be in a first subset of the set of monitoring occasions associated with the first feature set or in a second subset of the set of monitoring occasions associated with the second feature set.

In some examples of the method, apparatuses, and non-transitory computer-readable medium described herein, the receiving may include operations, features, means, or instructions for monitoring a UE-specific search space and a common search space for DCI transmissions, and where DCI transmissions for the first feature set may be provided in the UE-specific search space and DCI transmissions for the second feature set may be provided in the common search space.

Some examples of the method, apparatuses, and non-transitory computer-readable medium described herein may further include operations, features, means, or instructions for, when at least a portion of the UE-specific search space and the common search space overlap, the DCI transmissions of the first feature set may have priority over DCI transmissions of the second feature set, the DCI transmissions of the second feature set may have priority over DCI transmissions of the first feature set, or the base station may configure which of the first feature set or the second feature set DCI may have priority.

In some examples of the method, apparatuses, and non-transitory computer-readable medium described herein, the receiving may include operations, features, means, or instructions for attempting to decode the DCI using a first hashing function and a second hashing function, and where the first feature set may have DCI with the first hashing function and the second feature set may have DCI with the second hashing function, and overlapping portions of the first hashing function and the second hashing function may be associated with the first feature set, the second feature set, or a feature set as configured by the base station.

In some examples of the method, apparatuses, and non-transitory computer-readable medium described herein, a first subset of candidate wireless resource locations may be associated with DCI of the first feature set and a second subset of candidate wireless resources locations may be associated with DCI of the second feature set.

In some examples of the method, apparatuses, and non-transitory computer-readable medium described herein, the DCI includes a CRC, and where the receiving may include operations, features, means, or instructions for determining that the DCI transmission may be for the first feature set based on successfully decoding the CRC using a first CRC mask, and determining that the DCI transmission may be for the second feature set based on successfully decoding the CRC using a second CRC mask.

In some examples of the method, apparatuses, and non-transitory computer-readable medium described herein, the first CRC mask includes a radio network temporary identifier (RNTI) of the UE prefixed with a first sequence of bits, and the second CRC mask includes the RNTI of the UE prefixed with a second sequence of bits.

In some examples of the method, apparatuses, and non-transitory computer-readable medium described herein, the first sequence of bits may be all zeros.

In some examples of the method, apparatuses, and non-transitory computer-readable medium described herein, the first CRC mask corresponds to a radio network temporary identifier (RNTI) of the UE, and the second CRC mask corresponds to the RNTI with at least a subset of bits that may be inverted.

In some examples of the method, apparatuses, and non-transitory computer-readable medium described herein, the receiving may include operations, features, means, or instructions for determining that the DCI transmission corresponds to the first feature set or the second feature set based on a scrambling sequence used to scramble the DCI or a demodulation reference signal (DMRS).

In some examples of the method, apparatuses, and non-transitory computer-readable medium described herein, the receiving may include operations, features, means, or instructions for determining that the DCI transmission corresponds to the first feature set or the second feature set based on a bandwidth part used to transmit the DCI.

A method of wireless communications at a UE is described. The method may include receiving, from the base station via a DCI transmission, an indication of whether an uplink transmission will be for a first feature set or a second feature set that are configured at the UE, where DCI associated with the first feature set has a same size as DCI associated with the second feature set, determining that first uplink data of the first feature set and second uplink data of the second feature set are to be transmitted to the base station, and multiplexing the first uplink data and the second uplink data into the uplink transmission, where the multiplexing is based on whether the uplink transmission is for the first feature set or the second feature set, a priority of the first feature set relative to the second feature set, an amount of data that can be transmitted via the uplink transmission relative to an amount of the first uplink data or the second uplink data, or any combination thereof.

An apparatus for wireless communications at a UE is described. The apparatus may include a processor, memory in electronic communication with the processor, and instructions stored in the memory. The instructions may be executable by the processor to cause the apparatus to receive, from the base station via a DCI transmission, an indication of whether an uplink transmission will be for a first feature set or a second feature set that are configured at the UE, where DCI associated with the first feature set has a same size as DCI associated with the second feature set, determine that first uplink data of the first feature set and second uplink data of the second feature set are to be transmitted to the base station, and multiplex the first uplink data and the second uplink data into the uplink transmission, where the multiplexing is based on whether the uplink transmission is for the first feature set or the second feature set, a priority of the first feature set relative to the second feature set, an amount of data that can be transmitted via the uplink transmission relative to an amount of the first uplink data or the second uplink data, or any combination thereof.

Another apparatus for wireless communications at a UE is described. The apparatus may include means for receiving, from the base station via a DCI transmission, an indication of whether an uplink transmission will be for a first feature set or a second feature set that are configured at the UE, where DCI associated with the first feature set has a same size as DCI associated with the second feature set, determining that first uplink data of the first feature set and second uplink data of the second feature set are to be transmitted to the base station, and multiplexing the first uplink data and the second uplink data into the uplink transmission, where the multiplexing is based on whether the uplink transmission is for the first feature set or the second feature set, a priority of the first feature set relative to the second feature set, an amount of data that can be transmitted via the uplink transmission relative to an amount of the first uplink data or the second uplink data, or any combination thereof.

A non-transitory computer-readable medium storing code for wireless communications at a UE is described. The code may include instructions executable by a processor to receive, from the base station via a DCI transmission, an indication of whether an uplink transmission will be for a first feature set or a second feature set that are configured at the UE, where DCI associated with the first feature set has a same size as DCI associated with the second feature set, determine that first uplink data of the first feature set and second uplink data of the second feature set are to be transmitted to the base station, and multiplex the first uplink data and the second uplink data into the uplink transmission, where the multiplexing is based on whether the uplink transmission is for the first feature set or the second feature set, a priority of the first feature set relative to the second feature set, an amount of data that can be transmitted via the uplink transmission relative to an amount of the first uplink data or the second uplink data, or any combination thereof.

In some examples of the method, apparatuses, and non-transitory computer-readable medium described herein, the first feature set includes a first service and the second feature set includes a second service.

In some examples of the method, apparatuses, and non-transitory computer-readable medium described herein, the first service may be an ultra-reliable low-latency communication (URLLC) service and the second service may be an enhanced mobile broadband (eMBB) service, and where the multiplexing includes multiplexing the first uplink data with a higher priority than the second uplink data when the uplink transmission may be for the first service.

In some examples of the method, apparatuses, and non-transitory computer-readable medium described herein, multiplexing further may include operations, features, means, or instructions for multiplexing the first uplink data and the second uplink data based on one or more flow control parameters associated with the first service and the second service.

In some examples of the method, apparatuses, and non-transitory computer-readable medium described herein, the one or more flow control parameters include a token arrival rate and a bucket size of a token-bucket flow controller.

In some examples of the method, apparatuses, and non-transitory computer-readable medium described herein, when the uplink transmission may be for the second service, the multiplexing may include operations, features, means, or instructions for determining that a coding rate for the uplink transmission may be below a threshold value, and multiplexing, based on the determining, the first uplink data and the second uplink data based on one or more flow control parameters associated with the first service and the second service.

DETAILED DESCRIPTION

Figure 1:
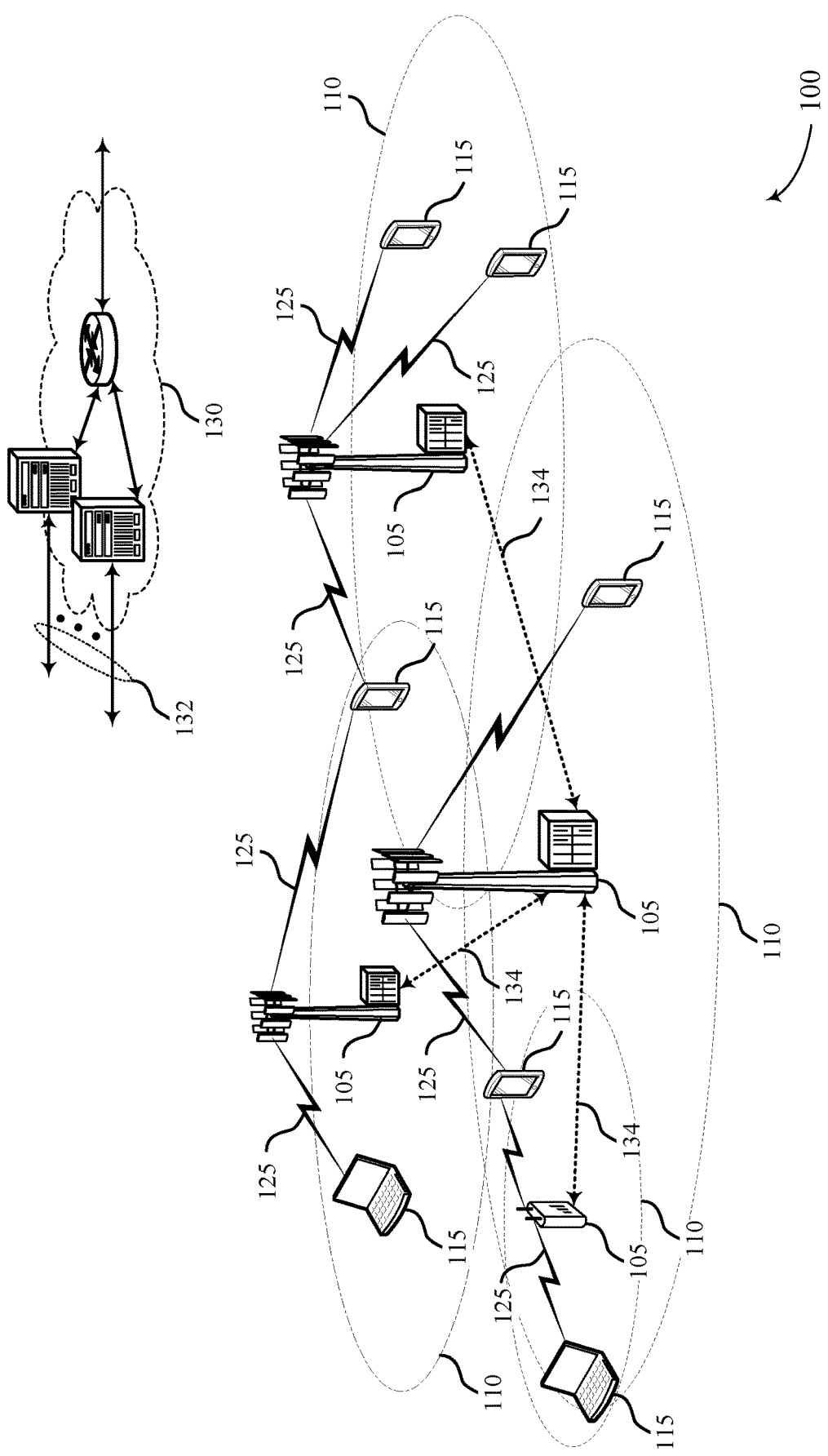
FIG. 1 illustrates an example of a system for wireless communications that supports service and format indication techniques for downlink control information in accordance with aspects of the present disclosure.

In some wireless communications systems, multiple different wireless services may be implemented, and in some cases a UE may be capable of communications using two or more services. Various described techniques provide for downlink control information (DCI) that indicates a service for an associated operation. A UE may identify the service for communications with a base station based on an indication provided by the DCI, and the UE and base station may communicate according to the identified service. In some cases, different services have a same DCI size. Additionally or alternatively, a DCI format may be indicated by a masking operation on a cyclic redundancy check (CRC) of the DCI. In some cases, the CRC may be masked using a radio network temporary identifier (RNTI) of the UE with an added prefix in indicate a first DCI format, and may be masked using the RNTI of the UE without the added prefix to indicate a second DCI format.

For example, as indicated above, some systems may have an ultra-reliability low-latency communication (URLLC) service that has relatively stringent error rates and latency bounds for certain types of communications (e.g., high priority communications such as vehicle-to-vehicle (V2V) communications), and an enhanced mobile broadband (eMBB) service that has more related error rates and latency bounds (e.g., lower priority and higher data rate communications such as voice over Internet protocol (VoIP)). A UE having capability for communications using two or more different services may be signaled to indicate a particular service that is to be used for communications, and techniques for such signaling as provided herein may help to enhance network efficiency and reliability. For example, different services may correspond to different feature sets that may include different processing timelines, different assumptions for channel quality indication (CQI) calculations, and the like, and an indication provided by DCI according to various techniques as discussed herein may indicate operations to be performed at the UE.

Further, in some cases, a UE may be configured with two or more semi-persistent scheduling (SPS) services that have short and long periodicities (e.g., for downlink transmissions, uplink transmissions, or both), in which short periodicity may be for a first service (e.g., a URLLC SPS service), and long periodicity may be for a second service (e.g., an eMBB SPS service). In some cases, such SPS configurations may be activated and released by DCI whose CRC is masked by SPS cell RNTI (C-RNTI), or by a configured scheduling RNTI (CS-RNTI). Various techniques provided herein may further be used to indicate, for multiple SPS services that are masked by the same RNTI, activation/release of one or more one of SPS services. In some cases, a URLLC service may be used for paging (e.g., due to its relatively fast turnaround time), and in such cases the CRC may be masked by a paging RNTI (P-RNTI) that the UE may use to determine whether the paging command is for eMBB type of operation or for URLLC.

In some cases, the DCI in a DCI transmission may include an indicator field that may indicate the service of the associated operation. For example, a one-bit indicator may be provided that indicates whether the DCI is for a first service (e.g., a URLLC service) or a second service (e.g., an eMBB service). In some cases, only certain instances of DCI may be available to indicate different services, and the indicator field may be included only in DCI in such instances (e.g., in a UE-specific search space (UESS), a cell specific search space (CSS), in certain monitoring locations, for certain starting resources of the DCI, or combinations thereof). In some cases, an indication field may not be provided in the DCI, and different monitoring occasions of the DCI transmissions may be associated with different services, or different DCI search spaces may be associated with different services. Additionally or alternatively, different scrambling sequences used on all or a portion of control information or demodulation reference signal transmissions may be associated with different services. In some further examples, an RNTI of the UE may be masked using different masks to indicate different services.

Aspects of the disclosure are initially described in the context of a wireless communications system. Aspects of the disclosure are further illustrated by and described with reference to apparatus diagrams, system diagrams, and flowcharts that relate to service indication techniques for downlink control information.

FIG. 1 illustrates an example of a wireless communications system 100 that supports service and format indication techniques for downlink control information in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband (e.g., eMBB) communications, ultra-reliable (e.g., mission critical or URLLC) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARM) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

In some cases, a UE 115 may transmit an indication to a base station 105 that the UE is capable of operations using two or more different feature sets, which may include two or more different services, such as a URLLC service and an eMBB service, channel or channel sets, procedure or channel priorities, etc. The base station 105 may perform scheduling and resources allocation to the UE 115 for each of the services, and may format DCI that indicates which of the services the DCI is associated with. In some cases, the different services may have a same DCI size. Additionally, in some cases, a DCI format may be indicated by a masking operation on a CRC of the DCI. Various examples of techniques for service and DCI format indication are discussed with respect to FIGS. 2 through 4.

Figure 2:
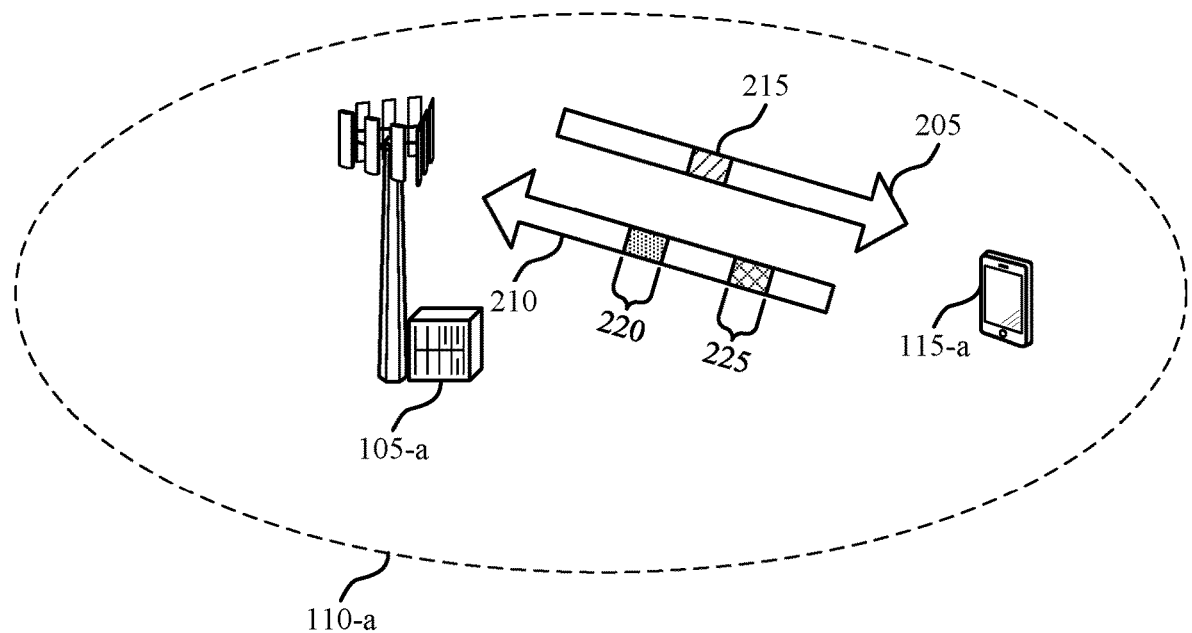
FIG. 2 illustrates an example of a wireless communications system that supports service and format indication techniques for downlink control information in accordance with aspects of the present disclosure.

FIG. 2 illustrates an example of a wireless communications system 200 that supports service and format indication techniques for downlink control information in accordance with aspects of the present disclosure. In some examples, wireless communications system 200 may implement aspects of wireless communications system 100. In some examples, the wireless communications system 200 may include a base station 105-a and UE 115-a, which may be examples of the corresponding devices as described with reference to FIG. 1. UE 115-a may communicate with the base station 105-a within a coverage area 110-a.

In some examples, the base station 105-a may transmit downlink transmissions 205 to the UE 115a, and UE 115a may transmit uplink transmissions 210 to the base station. The downlink transmissions 205 and uplink transmissions 210 may be made via one or more carriers. As indicated above, in some cases, the UE 115a may provide the base station 105-a with a capability indication 220 that indicates that the UE is capable of supporting one or more different feature sets. A feature set may include different service or procedure types (e.g., eMBB service/procedure or a URLLC service/procedure), channel or channel sets, service or procedure priority, etc. Accordingly, a UE 115 may be capable of supporting only one type or service (e.g., only an eMBB service or only a URLLC service), or two or more services (e.g., the UE 115a is capable of supporting both an eMBB service and a URLLC service). Accordingly, the base station 105 may ascertain the one or more feature sets (e.g., services or procedures) supported by UE 115 based on the feature set capability indication. The base station 105-a may configure resources for various uplink and downlink transmissions, including physical downlink control channel (PDCCH) transmissions, physical downlink shared channel (PDSCH) transmissions, physical uplink control channel (PUCCH), physical uplink shared channel (PUSCH), and physical random access channel (PRACH) resources, among others.

The base station 105-a may also perform scheduling and resource allocation for the UE 115a for each of the services that are supported at the UE 115a. For example, if data for a first service (e.g., URLLC data), or data for a second service (e.g., eMBB data) is to be transmitted to the UE 115a or transmitted by the UE 115a, the base station 105-a may allocate resources for such transmission, and may provide an indication of the resources in DCI transmission 215. In some cases, the base station 105-a may format the DCI transmission 215 such that the base station 105-a provides an indication of which of the services the DCI is associated with. For example, if the DCI transmission 215 is associated with the first service, the DCI transmission 215 may indicate the first service to the UE 115a, and the UE may perform operations associated with the first service (e.g., operations according to the first service timelines or assumptions for CQI calculation). Likewise, if the DCI transmission 215 is associated with the second service, the DCI transmission 215 may indicate the second service to the UE 115a, and the UE may perform operations associated with the second service. In some cases, the different services may have a same DCI size. In some cases, the DCI transmission 215 may indicate a priority of channels (e.g., if a collision occurs), may indicate what procedure (e.g., service) should be followed for a given channel, and may inform the UE to which codebook the HARQ-ACK bit associated with a PDSCH belongs.

The UE 115a may transmit uplink transmissions 225 to the base station 105-a based on the configured services indicated in the DCI transmission 215. In some cases, the different services (e.g. feature sets) may be multiplexed in the uplink transmission 225 according to a multiplexing configuration that may be provided to the UE 115a by the base station 105-a. In some cases, the UE 115a may multiplex the first service with the second service in accordance with the multiplexing configuration. For example, if the uplink transmission 225 is associated with the first service (e.g., URLLC) as indicated in the DCI transmission 215, the UE 115a may multiplex uplink data of the first service and the second service (e.g., eMBB). In such cases, the data of the first service, such as URLLC data, may be given strictly higher priority than data of the second service, such as eMBB data. In other cases, a token-bucket flow control scheme may be used, and data multiplexed in accordance with different parameters of token arrival rate and maximum bucket size for the first and second services. In some cases, if the uplink transmission 225 is associated with the second service (e.g., eMBB) as indicated in the DCI transmission 215, data of the first service (e.g., URLLC data) may not be multiplexed in the uplink transmission 225. In such cases, a reliability target of the first service may not be supported by the second service, and thus data of the first service is not transmitted. In other cases, a threshold value associated with reliability of the second service may be established that may indicate that the uplink transmission 225 can meet the reliability target of the first service, and if the uplink grant of the uplink transmission 225 meets the threshold value, the data of the first service may be multiplexed with data of the second service. Such a threshold value may be, for example, a coding rate (e.g., from a modulation and coding scheme (MCS)), or one or more channel quality parameters.

In some cases, the DCI transmission 215 may include a number of control information fields, which may include an indicator field that may indicate the service of the associated operation. For example, a one-bit indicator may be provided that indicates whether the DCI transmission 215 is for the first service or second service. In some cases, only certain instances of DCI transmissions 215 may be available to indicate different services, and the indicator field may be included only in DCI in such instances (e.g., in a UE-specific search space (UESS), a cell specific search space (CSS), in certain monitoring locations, for certain starting resources of the DCI, or combinations thereof). In some cases, an indication field may not be provided in the DCI transmission 215, and different characteristics of the DCI transmissions 215 may be used to indicate the different services. For example, different monitoring occasions of the DCI transmissions 215 may be associated with different services, or different DCI search spaces may be associated with different services. Additionally or alternatively, different scrambling sequences used on all or a portion of control information or demodulation reference signal transmissions may be associated with different services. In some further examples, an RNTI of the UE 115a (e.g., a C-RNTI, CS-RNTI, or P-RNTI) may be masked using different masks to indicate different services. In some further examples, different RNTIs may be provided to UE 115a by base station 105-a to differentiate different services.

As indicated above, an indication from a DCI transmission 215 may thus allow the UE 115a to identify an associated service. In some cases, even if the UE 115a supports only a single service, such as only supporting a URLLC service, the UE 115a may still monitor for DCI of another service, such as an eMBB PDCCH, for fallback operation. In this example, because the eMBB service is only used for fallback, the corresponding eMBB DCI may be sent in CSS, and URLLC DCI in UESS.

Further, in some cases, the UE 115a may be configured with two or more SPS services that have short and long periodicities (e.g., for downlink transmissions, uplink transmissions, or both), in which short periodicity may be for the first service (e.g., a URLLC SPS service), and long periodicity may be for the second service (e.g., an eMBB SPS service). In some cases, such SPS configurations may be activated and released using DCI transmission 215 in such as provided herein.

In some cases, the different services may have separate RRC configurations for SPS. For example, eMBB and URLLC may have separate RRC-configurations for uplink transmission with configured grant Type 1, uplink transmission with configured grant type 2, downlink SPS, or combinations thereof. Uplink grant types may indicate, in some systems, a type of grant free uplink transmission that the UE 115a may transmit, which may include grant Type 1 that is based only on RRC configuration without additional signaling (e.g., without any DCI or L1 signaling), and grant Type 2 that is based on RRC configuration and additional DCI signaling for activation/deactivation. In one example, for downlink SPS, the base station 105-a may configure two information elements (IEs) to the UE 115a, where one IE is the legacy eMBB downlink SPS, and the second IE is for the URLLC downlink SPS. Similarly, the base station 105-b may configure separate IEs for uplink transmission with configured grant Type 1 and separate IEs for uplink transmission with configured grant type 2. Such configurations may be activated and released using DCI transmission 215 in such as provided herein.

Additionally or alternatively, a DCI format may be indicated by a masking operation on a cyclic redundancy check (CRC) of the DCI transmission 215. In some cases, the CRC may be masked using the RNTI of the UE 115a with an added prefix in indicate a first DCI format, and may be masked using the RNTI of the UE 115a without the added prefix to indicate a second DCI format. In some cases, different DCI formats may have a same size, and the UE 115a may decode the DCI transmission 215 assuming the DCI size. The UE 115a may then check the CRC without a RNTI prefix, and if the CRC passes, the UE 115a parses DCI fields assuming the first DCI format (which in some cases may be a format for eMBB). If the CRC does not pass, the UE 115a may check the CRC with a RNTI prefix added to the RNTI of the UE 115a (e.g., a four-bit prefix of all-ones added ahead of the RNTI), and if that CRC passes, the UE 115a may parse the DCI fields assuming the second DCI format (which in some cases may be a format for URLLC). Thus, a DCI format or service indication may be determined based on the DCI transmission 215.

Figure 3:
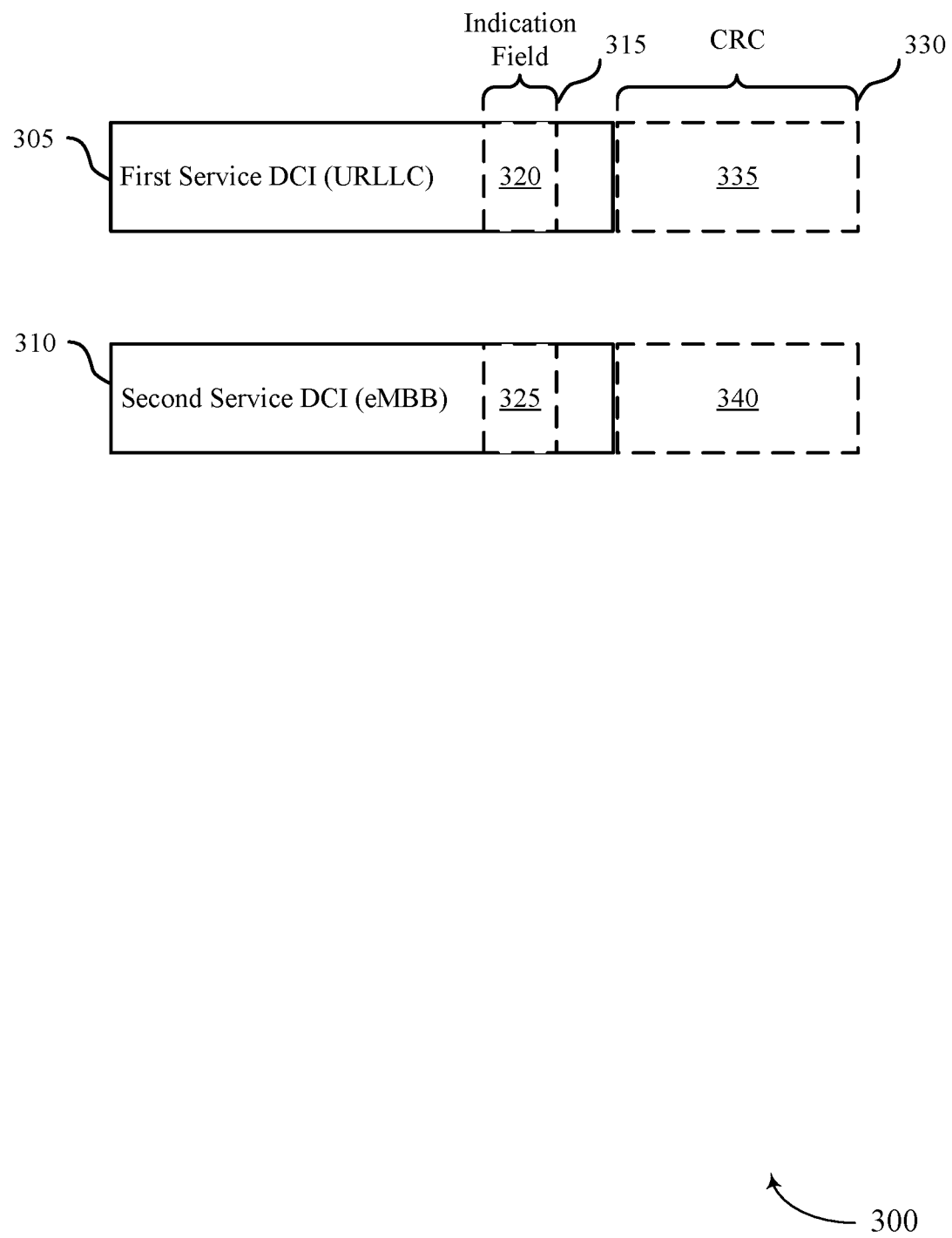
FIG. 3 illustrates an example of DCI transmissions that supports service and format indication techniques for downlink control information in accordance with aspects of the present disclosure.

FIG. 3 illustrates an example of DCI transmissions 300 that supports service and format indication techniques for downlink control information in accordance with aspects of the present disclosure. In some examples, DCI transmissions 300 may implement aspects of wireless communications system 100 or 200. In this example, a first DCI transmission 305 may be associated with a first service (e.g., a URLLC service), and a second DCI transmission 310 may be associated with a second service (e.g., an eMBB service).

The DCI transmissions 300, as discussed above, may provide an indication of one or more of an associated service or an associated DCI format. In some cases, the service may be indicated via at least one indication of a feature set corresponding to a service, and a feature set may include two or more different services, such as a URLLC service and an eMBB service, channel or channel sets, procedure or channel priorities, etc. In some cases, an indication field 315 may be included with control information, and a CRC 330 may be generated for each DCI, such that the first DCI transmission 305 may include a first indication field 320 and a first CRC 335, and the second DCI transmission 310 may include a second indication field 325 and a second CRC 340. As indicated above, the first DCI transmission 305 and the second DCI transmission 310 may have a same size.

In cases where the indication field 315 is provided to indicate the associated service, such a field may be one or more bits that are provided with other fields of the DCI transmissions 300 and may be parsed in accordance with a DCI configuration. In some cases, a base station, upon receiving an indication that a UE is capable of multiple services, may configure the UE with a DCI configuration. In some cases, the DCI configuration may be provided via radio resource control (RRC) signaling, and the base station may semi-statically configure the UE with a DCI configuration. In some examples, two services may be supported by the UE, and the indication field may be a one-bit indicator added to both the first DCI transmission 305 and the second DCI transmission 310. For example, the first indication field 320 may be a one-bit indicator that is set to one to indicate that the first DCI transmission 305 is for the first service (URLLC), and the second indication field 325 may be a one-bit indicator that is set to zero to indicate that the second DCI transmission 310 is for the second service (eMBB). In some cases, it may be desirable to have a relatively small DCI size for the first DCI transmission 305, since a small DCI size is desirable for URLLC. In such cases, the DCI size of each of the first DCI transmission 305 and the second DCI transmission 310 may be aligned with that of a fallback (FB) DCI for eMBB services.

In some cases, always adding a bit to the FB DCI may be avoided, and such a bit may be added when needed. Thus, in some cases, such an indication field 315 may be added to the DCI transmissions 300 via semi-static signaling (e.g., RRC signaling) such that the indication field 315 is added only when both services are configured at the UE. In other examples, the base station may schedule certain services using only a particular search space or CORESETs, and the addition of the indication field 315 may not be used. For example, URLLC may be scheduled only in UESS, or in all bandwidth parts (BWPs) excluding the initial BWP, and thus when the UE monitors the CSS or the initial BWP, the indication field 315 is not needed. Hence, depending on the need, and the possibility of monitoring both URLLC and eMBB DCIs, the UE can be configured with the additional indication field 315 for monitoring the FB DCIs.

Further, the different services may have different PDCCH monitoring occasions. For example, the eMBB DCI may be searched for only in the first few symbols of a slot, while the UE monitors PDCCH for URLLC in every mini-slot within the slot. When the monitoring occasions are not overlapping, the monitoring occasions themselves may be used as the service indicator and the indication field 315 may not be needed. In some cases, such DCI configuration for identifying the service indication may be indicated to the UE by higher layer signaling (e.g., via RRC signaling). Additionally or alternatively, search spaces may be used to provide a service indication. For example, eMBB DCI may be provided via a CSS and URLLC DCI in UESS, and thus the presence of a DCI transmission 300 in a particular search space may provide an indication of the associated service.

In other cases, multiple services may be scheduled via DCI of the UESS. In such case, differentiation between the multiple services may be made based on a hashing function performed on all or a portion of the DCI. In such cases a first hashing function may be associated with the first service, and a second hashing function may be associated with the second service, to provide two search spaces. A UE receiving the DCI may decode the DCI and perform the first hashing function to determine whether the DCI is associated with the first service. If the first hashing function fails to provide a successful decode of the DCI, the UE may perform the second hashing function to determine whether the DCI is associated with the second service. Thus, the UE blindly decodes the DCI based on the different hashing functions. In some examples, a number of blind decodes may be pre-allocated to the first service (e.g., for URLLC operation), such as by pre-configuring the number of decoding candidates per aggregation level. In cases where the search spaces are overlapping, a priority may be provided such that a DCI in the overlapping search spaces may be assumed to be for the higher priority service. For example, the UE may interpret the detected DCI as being for URLLC based on a DCI configuration indicating a higher priority for URLLC. In some further examples, a same search space may be shared for DCI transmissions of the different services, and a first subset of candidates of some ALs can be pre-configured to indicate the first service with a second subset of the candidates pre-configured to indicate the second service.

In further examples, the service indication may be provided by RNTI masking. In some cases, CRC 330 may be masked with the RNTI of the UE. For example, a 24-bit CRC may be calculated for the DCI, and the last 16 bits in the DCI CRC may masked (e.g., by an exclusive or (XOR) operation) with the 16-bit RNTI of the UE. In some cases, the CRC 330 may be masked such that the RNTI is prefixed with a sequence of bits when generating the DCI CRC mask. For example, the prefix can be all-zeros for the second service (eMBB), effectively rendering it invisible to eMBB-only UEs, and the prefix can be all-ones for the first service (URLLC), or another non-zero value. The selection of all-ones may be to maximize a distance from the eMBB mask. In some cases, length of the prefix may be eight or fewer bits, and a four or five bit prefix may be used in some cases which leaves the first three or four CRC bits unaffected by the masking operation. In other RNTI masking examples, one or more bits of the RNTI may be flipped when generating the DCI CRC mask. In such cases, the length of mask remains 16 bits, corresponding to the RNTI length. Such RNTI masking may provide an indication of the service to the UE with no increase in the number of blind decodes, which may enhance UE performance relative to techniques that result in one or more additional blind decodes at the UE. Such CRC masking can be applied to P-RNTI in addition to C-RNTI and CS-RNTI.

In further examples, the service indication may be provided by PDCCH scrambling. In such cases, the coded bits of the PDCCH may be scrambled, DMRS symbols may be scrambled, or combinations thereof. The service for the DCI in such cases may be indicated by changing the scrambling seed for coded bits or DMRS to indicate the first or second service. In such cases, PDCCH scrambling for URLLC remains the same as that for eMBB, with different scrambling seeds used.

In additional examples, different BWPs may be configured for the first and second service and may provide the service indication. In such cases, two or more BWPs may be configured for the services, and the presence of DCI in one of the BPWs may indicate that the corresponding service is indicated by the DCI. In the event that two or more of the BWPs overlap, one of the services may be prioritized, such as discussed above or one or more other techniques as discussed above may be used to differentiate the DCI (e.g., different DMRS scrambling may be provided for each BWP (e.g., scrambling could be a function of the BWP ID), etc.).

Further, in addition or alternatively to service indications, in some cases a DCI format may be indicated in the DCI transmissions. In some cases, RNTI CRC masking may be used as a DCI format indicator. In such cases, two different DCI formats share the same size (e.g., size X). The UE may decode DCI assuming the DCI size (X) and check the CRC without a RNTI prefix (i.e., the CRC masked with the RNTI only). If the CRC passes, the UE parses the DCI fields assuming a first DCI format. If the CRC does not pass, the UE may check the CRC with a RNTI prefix (e.g., the RNTI prefixed by all-ones), and if the CRC passes, the UE parses the DCI fields assuming a second DCI format. In such cases, the second DCI format may not be exclusive to the second service, and can also be used by the first service. The second DCI format, in some case, may still trigger certain behavior, such as an MCS index that refers to an MCS table different from that of the first DCI format.

Figure 4:
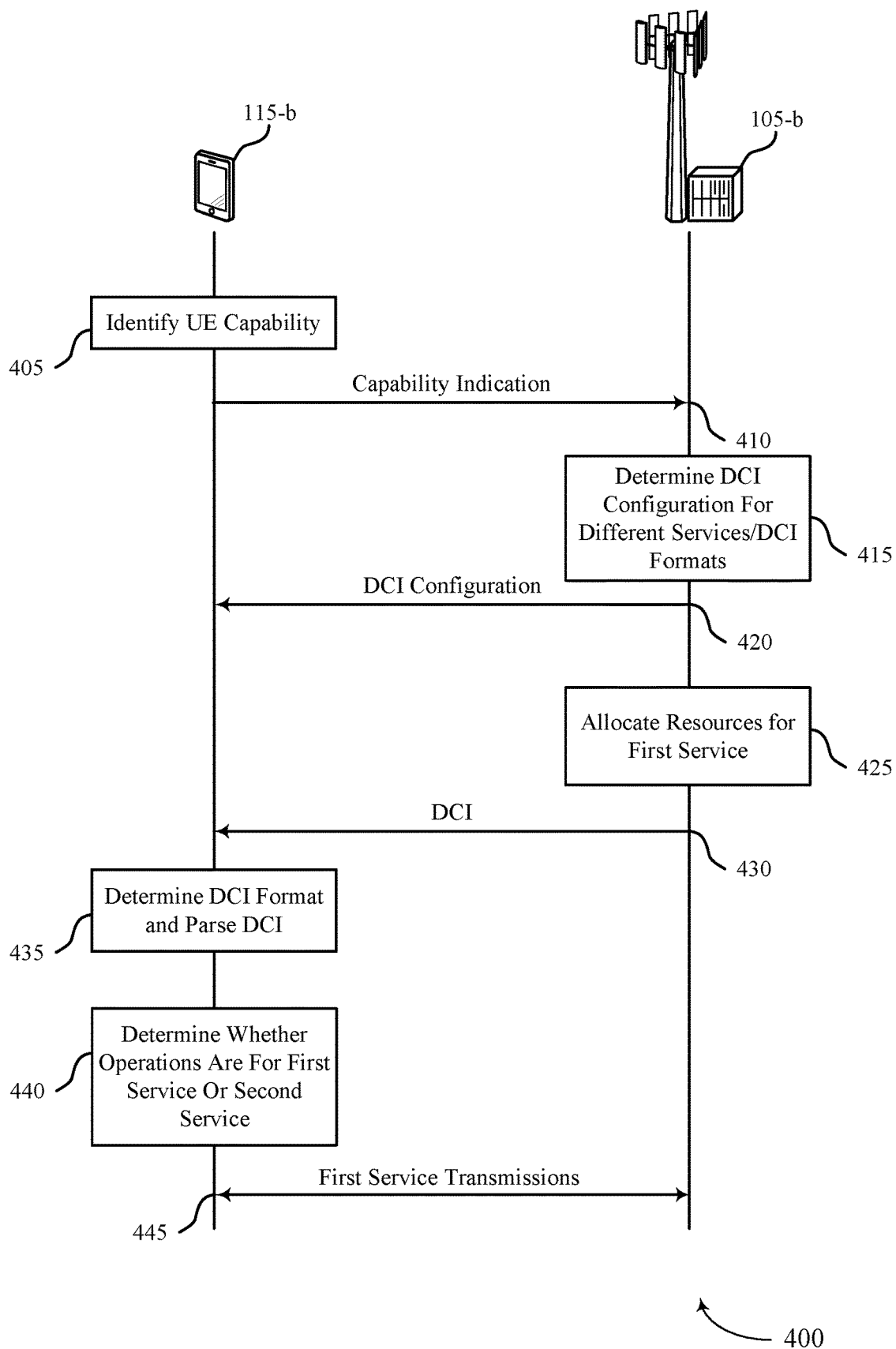
FIG. 4 illustrates an example of a process flow that supports service and format indication techniques for downlink control information in accordance with aspects of the present disclosure.

FIG. 4 illustrates an example of a process flow 400 that supports service and format indication techniques for downlink control information in accordance with aspects of the present disclosure. In some examples, process flow 400 may implement aspects of wireless communications system 100 or 200. In this example, process flow 400 includes UE 115-*b* and base station 105-*b*, which may be examples of the corresponding devices described with reference to FIGS. 1 and 2.

At 405, the UE 115-*b* may identify a UE capability. The UE capability may include, for example, a capability for the UE 115-*b* to communicate using one or more different feature sets, which may include a URLLC service, an eMBB service, one or more other services, channel or channel sets, procedure or channel priorities, etc., or combinations thereof. The UE 115-*b* may transmit a capability indication 410 to the base station 105-*b* to indicate the UE capability. In some cases, the capability indication 410 may be provided as part of control signaling in an connection establishment. In some cases, the capability indication 410 may be provided as part of a UE capability indicator, a UE category indication, or a UE feature set indication.

At 415, the base station 105-*b* may determine a DCI configuration for different services or for different DCI formats, or combinations thereof. In some cases, the DCI configuration may include formatting a service indication field into DCI transmissions. In some cases, the DCI configuration may include identifying one or more monitoring occasions, search spaces, hashing functions, scrambling sequences, RNTI masks, or bandwidth parts that are associated with the different services, such as discussed above. The base station 105-*b* may transmit the DCI configuration 420 to the UE 115-*b*. In some cases, the DCI configuration 420 may be a semi-static configuration provided to the UE 115-*b* via RRC signaling. In cases where the base station 105-*b* determines different DCI formats, the DCI configuration may include an RNTI mask to be applied that corresponds to the different DCI formats, as discussed above.

At 425, the base station 105-*b* may allocate resources for the first service. In some cases, the first service may be a URLLC service or an eMBB service, as discussed above. The base station 105-*b* may allocate resources based on buffered data that is to be transmitted, for example. The base station 105-*b* may format and transmit DCI 430 to the UE 115-*b* that may indicate the allocated resources, and also provide an indication of the service and/or DCI format.

At 435, the UE 115-*b* may receive the DCI 430, determine the DCI format, and parse the DCI in accordance with the DCI format. In some cases, as discussed above, the DCI format may be determined based on an RNTI mask that is applied to the DCI CRC. In some cases, a same DCI format is used for each of the services, and the DCI may be parsed in accordance with that DCI format.

At 440, the UE 115-*b* may determine whether operations are for the first service or the second service. Such a determination may be made according to any of the techniques discussed above. The UE 115-*b* and base station 105-*b* may then communicate according to the first service via first service transmissions 445.

Figure 5:
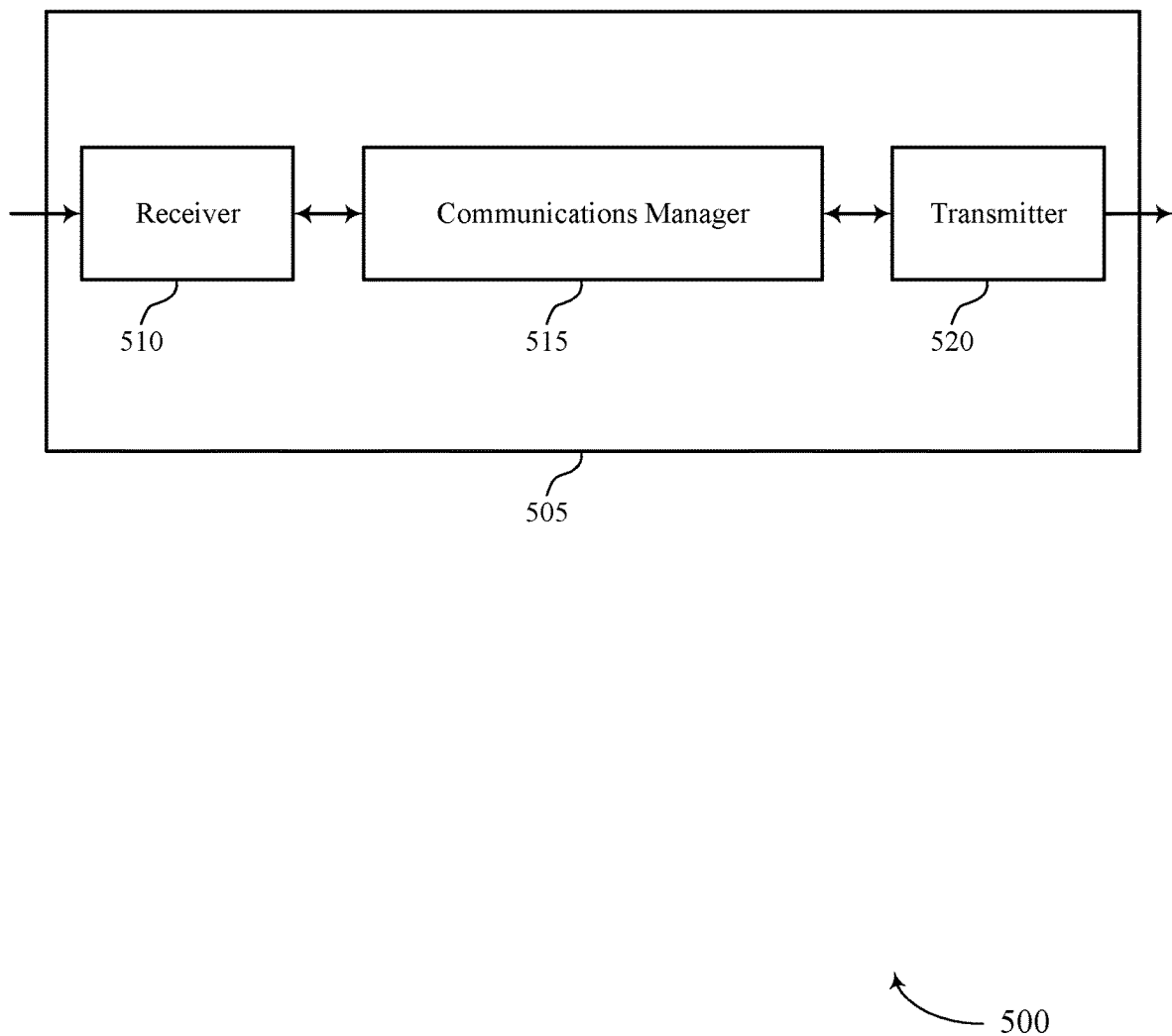
FIGS. 5 and 6 show block diagrams of devices that support service and format indication techniques for downlink control information in accordance with aspects of the present disclosure.

FIG. 5 shows a block diagram 500 of a device 505 that supports service and format indication techniques for downlink control information in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to service and format indication techniques for downlink control information, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may transmit a signal to a base station that the UE is capable of supporting a first feature set, a second feature set, or a combination thereof, receive, from the base station via a DCI transmission, an indication whether an associated operation will be for the first feature set or the second feature set, where DCI associated with the first feature set has a same size as DCI associated with the second feature set, and communicate according to the first feature set or the second feature set based on the indication.

The communications manager 515 may also receive, from a base station, a DCI transmission, the DCI transmission including a control information portion and a CRC portion, determine a format of the control information portion from two or more available DCI formats based on a mask applied to the CRC portion, and parse the control information portion based on the determined format. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
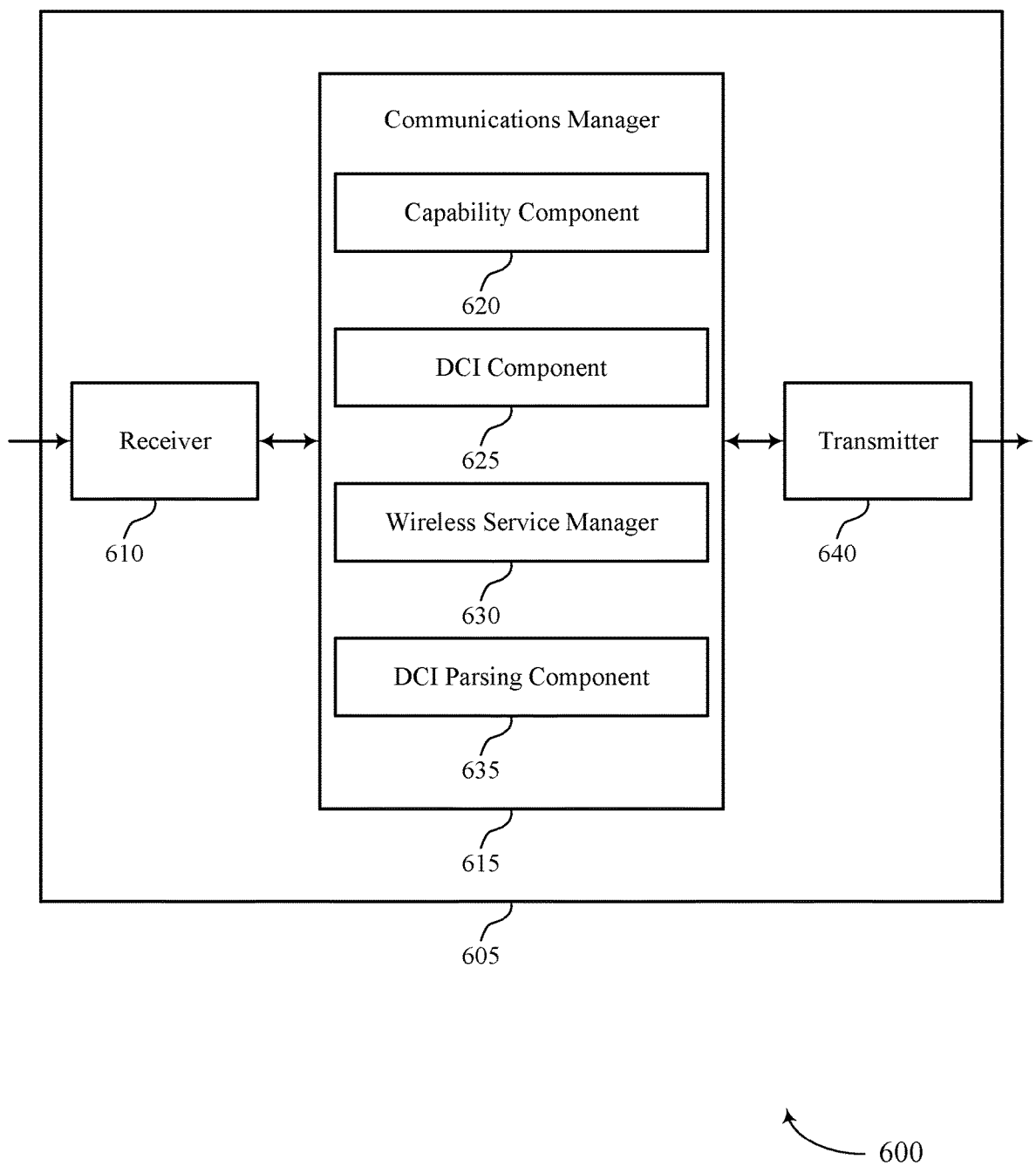

FIG. 6 shows a block diagram 600 of a device 605 that supports service and format indication techniques for downlink control information in accordance with aspects of the present disclosure. The device 605 may be an example of aspects of a device 505 or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to service and format indication techniques for downlink control information, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a capability component 620, a DCI component 625, a wireless service manager 630, and a DCI parsing component 635.

The communications manager 615 may be an example of aspects of the communications manager 810 described herein.

The capability component 620 may provide for the UE to transmit a signal to a base station that the UE is capable of supporting a first feature set and a second feature set.

The DCI component 625 may receive, from the base station via a DCI transmission, an indication whether an associated operation will be for the first feature set or the second feature set, where DCI associated with the first feature set has a same size as DCI associated with the second feature set. In some cases, the DCI component 625 may receive, from a base station, a DCI transmission, the DCI transmission including a control information portion and a CRC portion and determine a format of the control information portion from two or more available DCI formats based on a mask applied to the CRC portion. The DCI parsing component 635 may parse the control information portion based on the determined format. The wireless service manager 630 may communicate according to the first feature set or the second feature set based on the indication.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
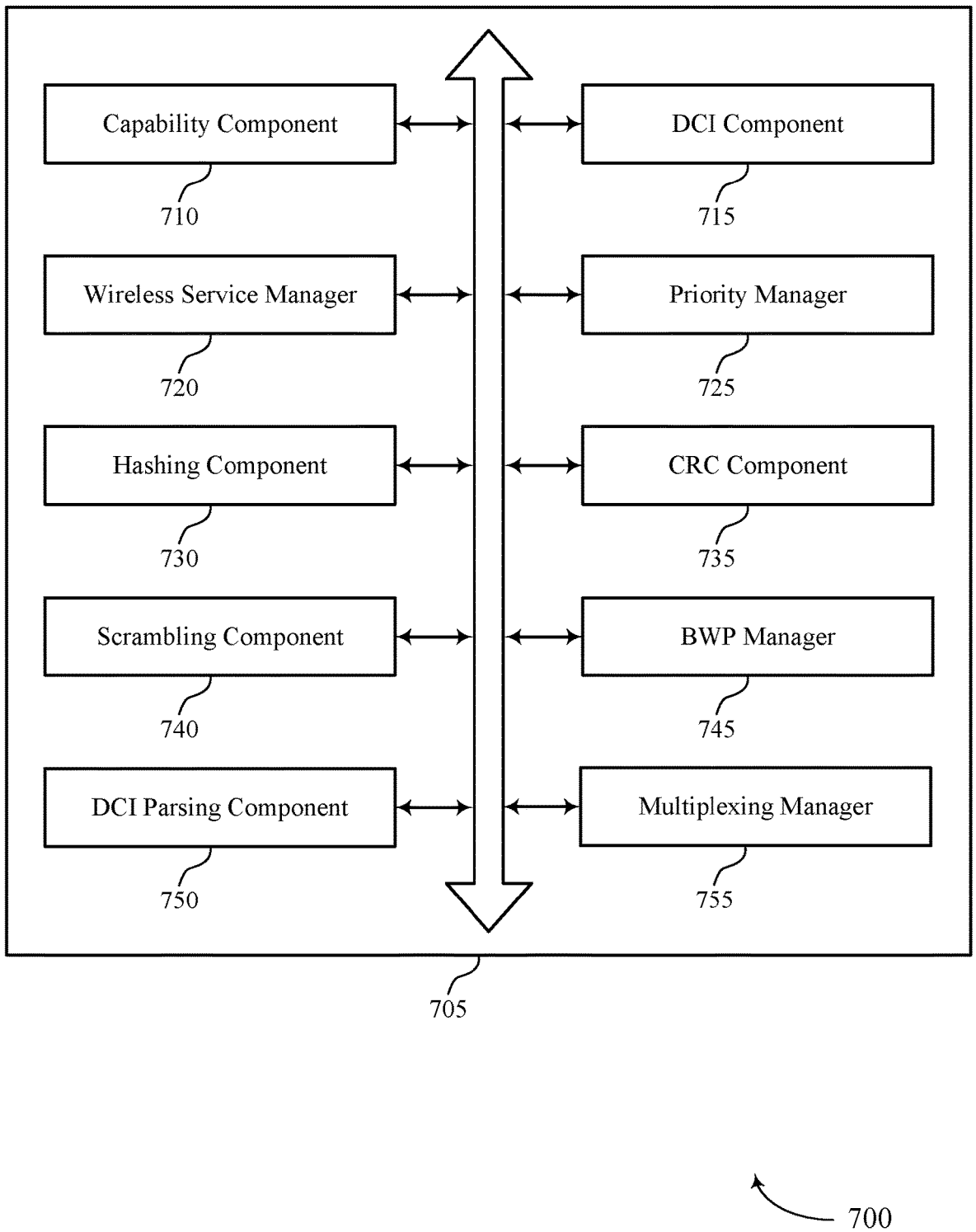
FIG. 7 shows a block diagram of a communications manager that supports service and format indication techniques for downlink control information in accordance with aspects of the present disclosure.

FIG. 7 shows a block diagram 700 of a communications manager 705 that supports service and format indication techniques for downlink control information in accordance with aspects of the present disclosure. The communications manager 705 may be an example of aspects of a communications manager 515, a communications manager 615, or a communications manager 810 described herein. The communications manager 705 may include a capability component 710, a DCI component 715, a wireless service manager 720, a priority manager 725, a hashing component 730, a CRC component 735, a scrambling component 740, a bandwidth part (BWP) manager 745, a DCI parsing component 750, and multiplexing manager 755. Each of these modules may communicate, directly or indirectly, with one another (e.g., via one or more buses).

The capability component 710 may cause the UE to transmit a signal to a base station that the UE is capable of supporting a first feature set and a second feature set.

The DCI component 715 may receive, from the base station via a DCI transmission, an indication whether an associated operation will be for the first feature set or the second feature set, where DCI associated with the first feature set has a same size as DCI associated with the second feature set. In some examples, the DCI component 715 may receive, from the base station via radio resource configuration (RRC) signaling, a DCI configuration for the first feature set and the second feature set. In some examples, the DCI component 715 may receive, from the base station, a DCI configuration that semi-statically configures for UE to monitor for the indication field.

In some examples, the DCI component 715 may monitor for DCI in a set of monitoring occasions, and where the indication whether the associated operation is for the first feature set or the second feature set is based on whether the DCI transmission is in a first subset of the set of monitoring occasions associated with the first feature set or in a second subset of the set of monitoring occasions associated with the second feature set. In some examples, the DCI component 715 may monitor a UE-specific search space and a common search space for DCI transmissions, and where DCI transmissions for the first feature set are provided in the UE-specific search space and DCI transmissions for the second feature set are provided in the common search space. In some examples, the DCI component 715 may determine whether operations associated with the DCI will be for a first feature set or a second feature set based on one or more of a service indication field within the control information portion, a monitoring occasion of the DCI transmission, a search space associated with the DCI transmission, a scrambling sequence used on all or a portion of the control information portion, a scrambling sequence used for a demodulation reference signal transmission, or any combination thereof.

In some cases, the DCI transmission includes an indication field having a value that indicates whether the associated operation will be for the first feature set or the second feature set. In some cases, the indication field is a one bit indicator. In some cases, a first subset of occasions for monitoring for DCI are in a UE-specific search space and a second subset of occasions for monitoring for DCI are in a common search space, and where the indication field is configured for DCI transmissions in the UE-specific search space, and where DCI transmissions in the common search space are associated only with one of the first feature set or the second feature set and do not include the indication field. In some cases, the UE monitors for DCI in a set of monitoring occasions and DCI transmissions that include the indication field are configured in a first subset of monitoring occasions, and where other DCI transmissions outside of the first subset of monitoring occasions are associated only with one of the first feature set or the second feature set and do not include the indication field. In some cases, a first subset of candidate wireless resource locations is associated with DCI of the first feature set and a second subset of candidate wireless resources locations is associated with DCI of the second feature set.

In some examples, the DCI component 715 may receive, from the base station, a DCI transmission, the DCI transmission including a control information portion and a CRC portion. In some examples, the DCI component 715 may determine a format of the control information portion from two or more available DCI formats based on a mask applied to the CRC portion. In some cases, the two or more available DCI formats have a same size.

The wireless service manager 720 may communicate according to the first feature set or the second feature set based on the indication. In some cases, the first feature set and the second feature set have different reliability targets, different latency targets, different target block error rates (BLER) for CSI computation, or combinations thereof. In some cases, the first feature set is an ultra-reliable low-latency communication (URLLC) service and the second feature set is an enhanced mobile broadband (eMBB) service.

The DCI parsing component 750 may parse the control information portion based on the determined DCI format.

The priority manager 725 may identify priorities of different services or feature sets. In some cases, the DCI transmissions of the first feature set have priority over DCI transmissions of the second feature set when at least a portion of the UE-specific search space and the common search space overlap.

The hashing component 730 may attempt to decode the DCI using a first hashing function and a second hashing function, and where the first feature set has DCI with the first hashing function and the second feature set has DCI with the second hashing function.

The CRC component 735 may determine that the DCI transmission is for the first feature set based on successfully decoding the CRC using a first CRC mask. In some examples, the CRC component 735 may determine that the DCI transmission is for the second feature set based on successfully decoding the CRC using a second CRC mask. In some examples, the CRC component 735 may perform a first CRC check assuming a first mask is applied to the CRC portion, the first mask associated with a first control information format. In some examples, the CRC component 735 may determine that the control information portion has the first control information format when the CRC check passes. In some examples, the CRC component 735 may perform a second CRC check when the first CRC check fails, the second CRC check assuming a second mask is applied to the CRC portion, the second mask associated with a second control information format.

In some examples, the CRC component 735 may determine that the control information portion has the second control information format when the second CRC check passes. In some cases, the first CRC mask includes a radio network temporary identifier (RNTI) of the UE prefixed with a first sequence of bits, and the second CRC mask includes the RNTI of the UE prefixed with a second sequence of bits. In some cases, the first CRC mask corresponds to a radio network temporary identifier (RNTI) of the UE, and the second CRC mask corresponds to the RNTI with at least a subset of bits that are inverted. In some cases, the RNTI is a C-RNTI, a P-RNTI, or a CS-RNTI. In some cases, the second mask corresponds to a radio network temporary identifier (RNTI) of the UE with an added prefix to indicate the second control information portion, and the first mask corresponds to the RNTI of the UE without the added prefix.

The scrambling component 740 may determine that the DCI transmission corresponds to the first feature set or the second feature set based on a scrambling sequence used to scramble the DCI or a demodulation reference signal (DMRS). In some cases, a downlink control channel (e.g., PDCCH) scrambling for the first feature set is the same as that for second feature set.

The BWP manager 745 may determine that the DCI transmission corresponds to the first feature set or the second feature set based on a bandwidth part used to transmit the DCI. In some examples, the BWP manager 745 may two or more BWPs are provided for the first feature set or second feature set, and when BWPs are overlapping DCI transmissions are differentiated based on one or more of a BWP-specific search space associated with each feature set, different monitoring opportunities associated with each feature set, or different DMRS scrambling for each BWP (e.g., scrambling is a function of the BWP ID).

The multiplexing manager 755 may determine that first uplink data of the first feature set and second uplink data of a second feature set are to be transmitted to the base station, and multiplex the first uplink data and the second uplink data into an uplink transmission. In some cases, the multiplexing may be based at least in part on whether the uplink transmission is for the first feature set or the second feature set, a priority of the first feature set relative to a priority of the second feature set, an amount of data that can be transmitted via the uplink transmission relative to an amount of the first uplink data or the second uplink data, or any combination thereof. In some cases, the first feature set may be a URLLC service and the second feature set may be an eMBB service, and the first uplink data may be prioritized ahead of the second uplink data when the uplink transmission is for the first feature set. In some cases, the multiplexing may be based on one or more flow control parameters associated with the first feature set and the second feature set, such as a token arrival rate and a bucket size of a token-bucket flow controller. In some cases, first uplink data is not multiplexed in the uplink transmission when the uplink transmission is for the second feature set. In other cases, when the uplink transmission is for the second feature set, the multiplexing may include determining that a coding rate or MCS for the uplink transmission is below a threshold value, and multiplexing the first uplink data and the second uplink data based on one or more flow control parameters (e.g., token bucket parameters) associated with the first feature set and the second feature set. In such cases, when the coding rate or MCS for the uplink transmission is at or above the threshold value, first uplink data is not multiplexed in the uplink transmission.

Figure 8:
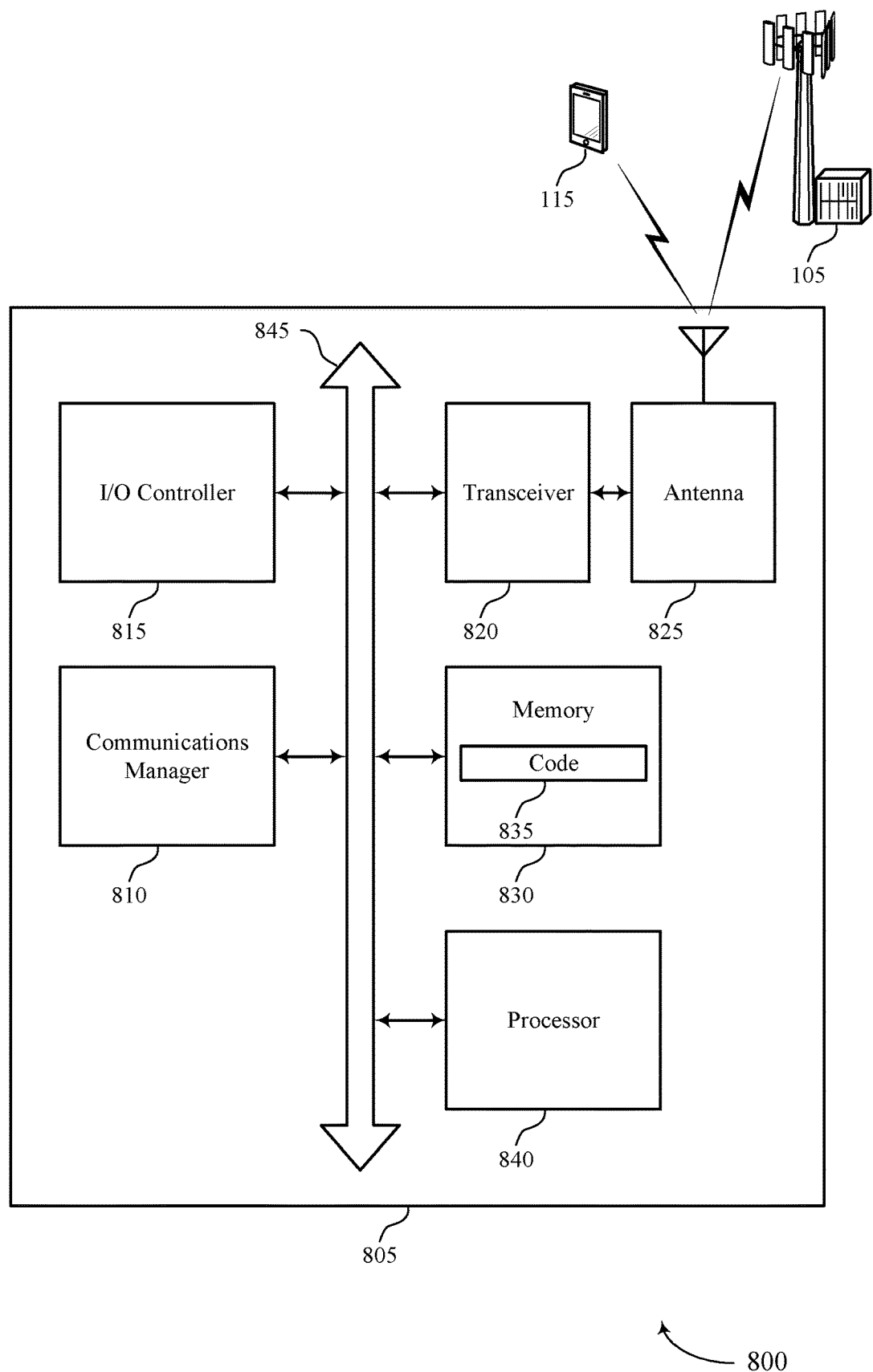
FIG. 8 shows a diagram of a system including a device that supports service and format indication techniques for downlink control information in accordance with aspects of the present disclosure.

FIG. 8 shows a diagram of a system 800 including a device 805 that supports service and format indication techniques for downlink control information in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may transmit, from a UE, a signal to a base station that the UE is capable of supporting a first feature set and a second feature set, receive, from the base station via a DCI transmission, an indication whether an associated operation will be for the first feature set or the second feature set, where DCI associated with the feature set service has a same size as DCI associated with the second feature set, and communicate according to the first feature set or the second feature set based on the indication. The communications manager 810 may also receive, from a base station, a DCI transmission, the DCI transmission including a control information portion and a CRC portion, determine a format of the control information portion from two or more available DCI formats based on a mask applied to the CRC portion, and parse the control information portion based on the determined format.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting service and format indication techniques for downlink control information).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
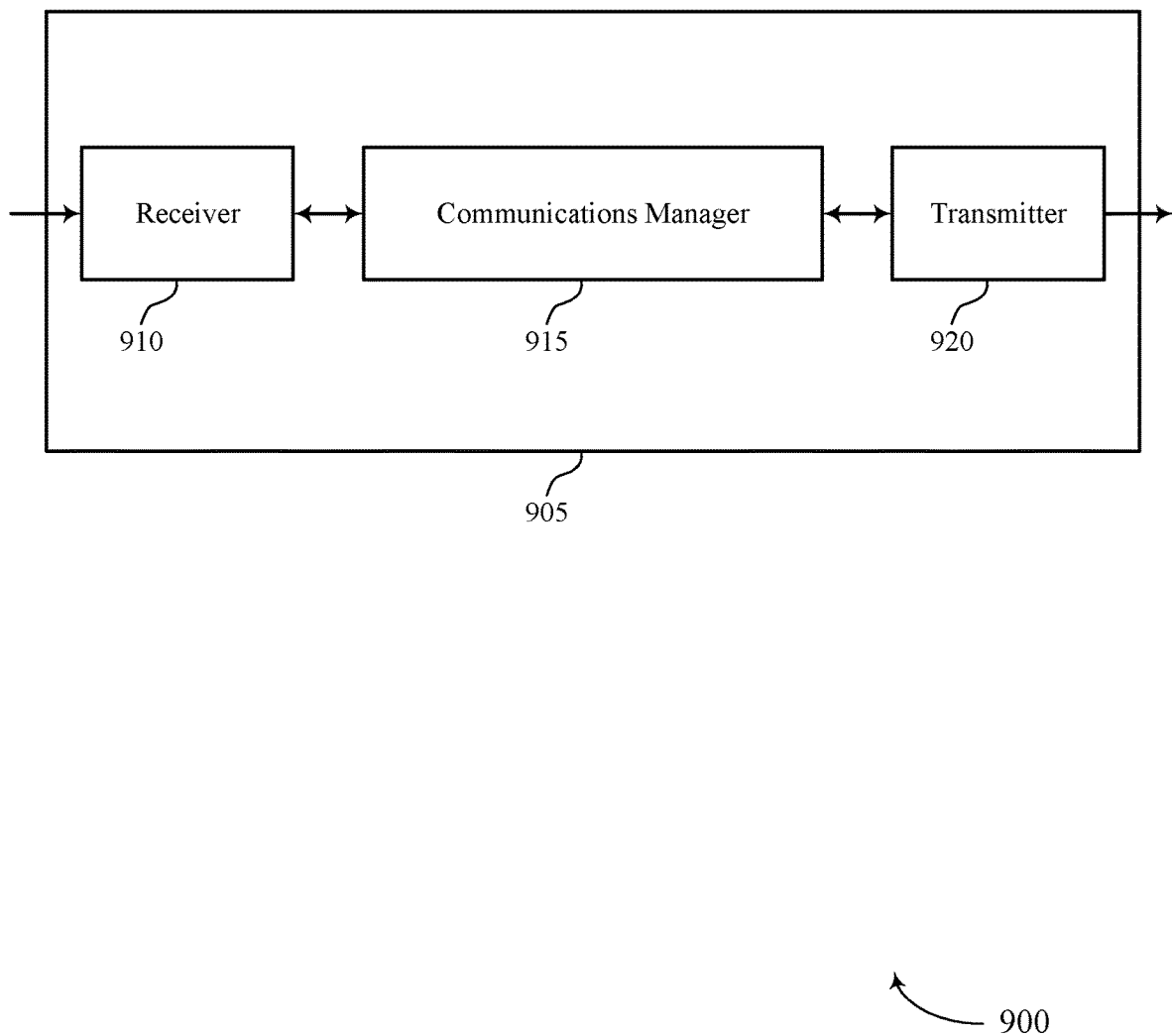
FIGS. 9 and 10 show block diagrams of devices that support service and format indication techniques for downlink control information in accordance with aspects of the present disclosure.

FIG. 9 shows a block diagram 900 of a device 905 that supports service and format indication techniques for downlink control information in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to service and format indication techniques for downlink control information, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive, from a UE, a signal that the UE is capable of supporting a first feature set and a second feature set, allocate resources for a transmission of the first feature set, and transmit a DCI transmission to the UE that provides the allocated resources for the transmission of the first feature set, where the DCI transmission indicates to the UE whether an associated operation will be for the first feature set or the second feature set, and where DCI associated with the first feature set has a same size as DCI associated with the second feature set.

The communications manager 915 may also configure two or more DCI formats at a UE, format a control information portion of a first DCI transmission according to a first DCI format, transmit the first DCI transmission to the UE, perform a CRC on the control information portion, apply a first mask to the CRC, the mask selected from two or more masks that are each associated with a corresponding DCI format, where the first mask is associated with the first DCI format, and append the masked CRC to the control information portion to generate the first DCI transmission. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
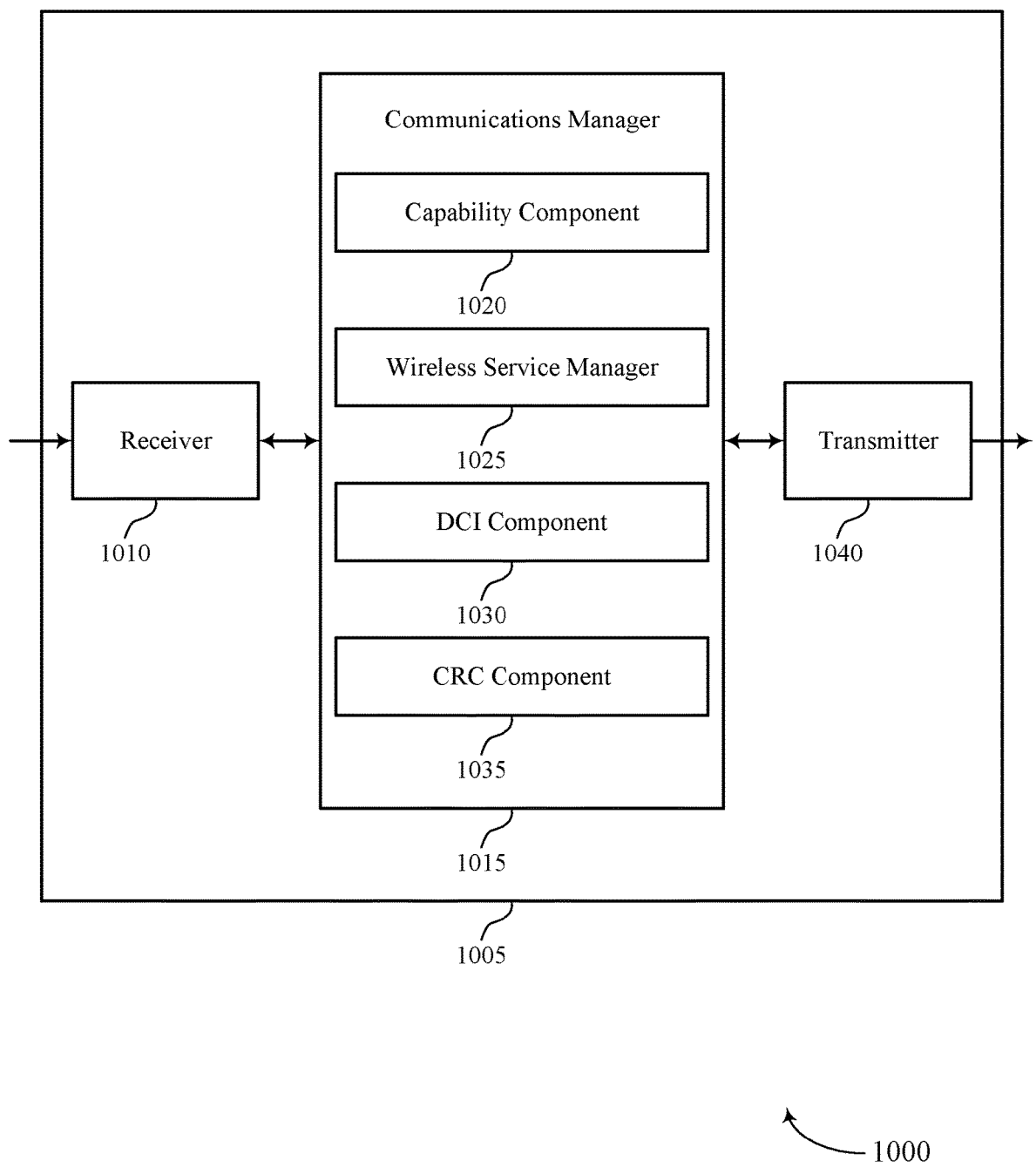

FIG. 10 shows a block diagram 1000 of a device 1005 that supports service and format indication techniques for downlink control information in accordance with aspects of the present disclosure. The device 1005 may be an example of aspects of a device 905 or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to service and format indication techniques for downlink control information, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a capability component 1020, a wireless service manager 1025, a DCI component 1030, and a CRC component 1035. The communications manager 1015 may be an example of aspects of the communications manager 1210 described herein.

The capability component 1020 may receive, from a UE, a signal that the UE is capable of supporting a first feature set and a second feature set.

The wireless service manager 1025 may allocate resources for a transmission of the first service.

The DCI component 1030 may transmit a DCI transmission to the UE that provides the allocated resources for the transmission of the first feature set, where the DCI transmission indicates to the UE whether an associated operation will be for the first feature set or the second feature set, and where DCI associated with the first feature set has a same size as DCI associated with the second feature set. In some cases, the DCI component 1030 may configure two or more DCI formats at a UE, format a control information portion of a first DCI transmission according to a first DCI format, and transmit the first DCI transmission to the UE.

The CRC component 1035 may perform a CRC on the control information portion, apply a first mask to the CRC, the mask selected from two or more masks that are each associated with a corresponding DCI format, where the first mask is associated with the first DCI format, and append the masked CRC to the control information portion to generate the first DCI transmission.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
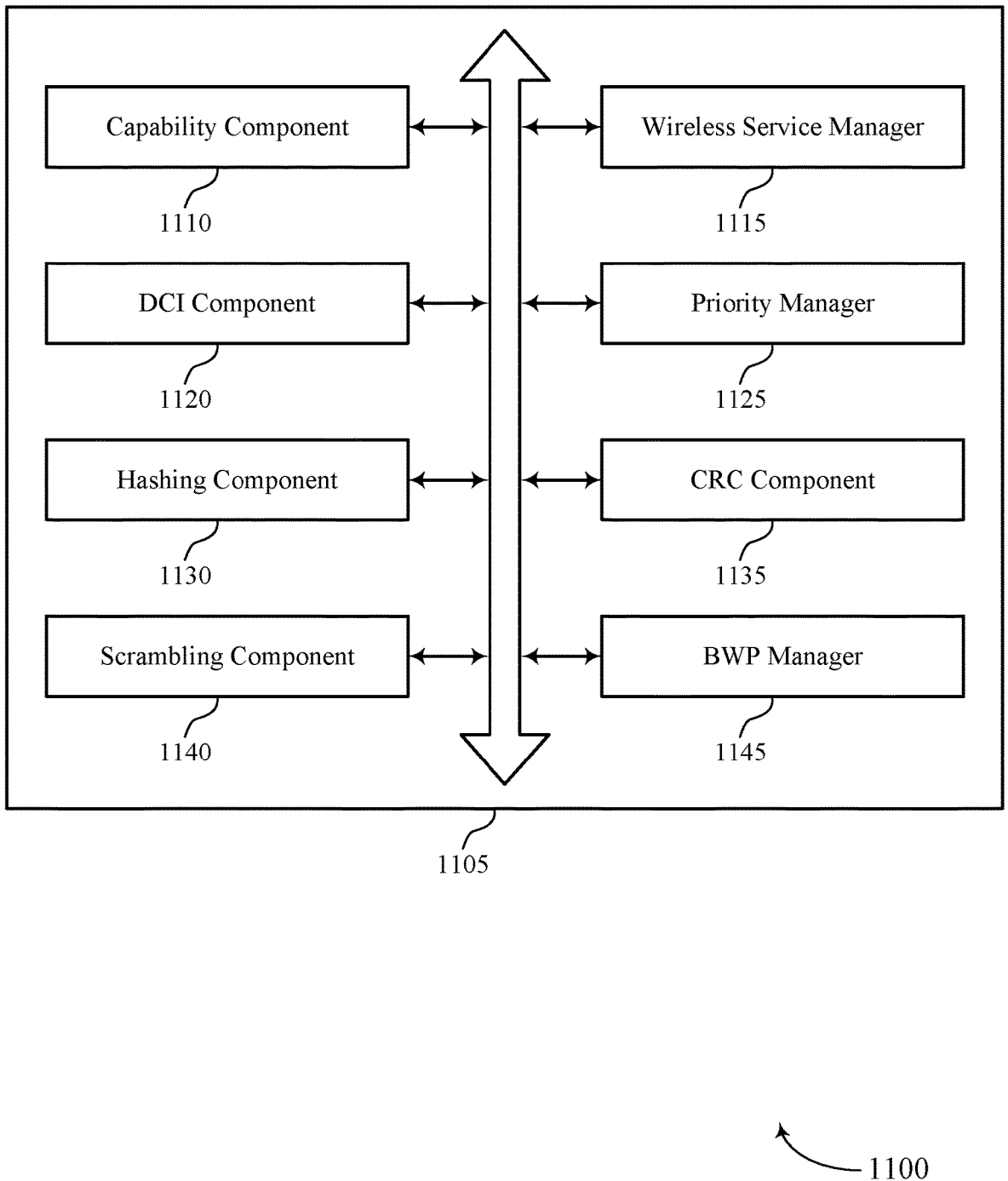
FIG. 11 shows a block diagram of a communications manager that supports service and format indication techniques for downlink control information in accordance with aspects of the present disclosure.

FIG. 11 shows a block diagram 1100 of a communications manager 1105 that supports service and format indication techniques for downlink control information in accordance with aspects of the present disclosure. The communications manager 1105 may be an example of aspects of a communications manager 915, a communications manager 1015, or a communications manager 1210 described herein. The communications manager 1105 may include a capability component 1110, a wireless service manager 1115, a DCI component 1120, a priority manager 1125, a hashing component 1130, a CRC component 1135, a scrambling component 1140, and a BWP manager 1145. Each of these modules may communicate, directly or indirectly, with one another (e.g., via one or more buses).

The capability component 1110 may receive, from a UE, a signal that the UE is capable of supporting a first feature set and a second feature set.

The wireless service manager 1115 may allocate resources for a transmission of the first feature set. In some cases, the first feature set and the second feature set have different reliability targets, different latency targets, different target block error rates (BLER) for CSI computation, or combinations thereof. In some cases, the first feature set is an ultra-reliable low-latency communication (URLLC) service and the second feature set is an enhanced mobile broadband (eMBB) service.

The DCI component 1120 may transmit a DCI transmission to the UE that provides the allocated resources for the transmission of the first feature set, where the DCI transmission indicates to the UE whether an associated operation will be for the first feature set or the second s feature set, and where DCI associated with the first service has a same size as DCI associated with the second feature set. In some examples, the DCI component 1120 may transmit, to the UE via radio resource configuration (RRC) signaling, a DCI configuration for the first feature set and the second feature set. In some examples, the DCI component 1120 may transmit, to the UE, a DCI configuration that semi-statically configures for UE to monitor for the indication field.

In some examples, the DCI component 1120 may configure a set of monitoring occasions for DCI transmissions, and where the indication whether the associated operation is for the first feature set or the second service is based on whether the DCI transmission is in a first subset of the set of monitoring occasions associated with the first feature set or in a second subset of the set of monitoring occasions associated with the second feature set. In some examples, the DCI component 1120 may configure a set of monitoring occasions for DCI transmissions, and where the indication whether the associated operation is for the first feature set or the second feature set is based on whether the DCI transmission is in a first subset of the set of monitoring occasions associated with the first feature set or in a second subset of the set of monitoring occasions associated with the second feature set. In some examples, the DCI component 1120 may configure a UE-specific search space and a common search space for DCI transmissions, and where DCI transmissions for the first feature set are provided in the UE-specific search space and DCI transmissions for the second feature set are provided in the common search space.

In some cases, the DCI transmission includes an indication field having a value that indicates whether the associated operation will be for the first feature set or the second feature set. In some cases, the indication field is a one bit indicator. In some cases, one or more occasions for the DCI transmission are in a UE-specific search space and one or more other occasions for the DCI transmission are in a common search space, and where DCI with the indication field is configured in the UE-specific search space, and where DCI transmissions in the common search space are associated only with one of the first feature set or the second feature set and do not include the indication field. In some cases, a DCI configuration includes a set of monitoring occasions and DCI transmissions that include the indication field are configured in a first subset of monitoring occasions, and where other DCI transmissions outside of the first subset of monitoring occasions are associated only with one of the first feature set or the second feature set and do not include the indication field. In some cases, a first subset of candidate wireless resource locations is associated with DCI of the first feature set and a second subset of candidate wireless resources locations is associated with DCI of the second feature set. In some cases, the first DCI transmission indicates to the UE whether an associated operation will be for a first feature set or a second feature set based on one or more of a service indication field within the control information portion, a monitoring occasion of the first DCI transmission, a search space associated with the first DCI transmission, a scrambling sequence used on all or a portion of the control information portion, a scrambling sequence used for a demodulation reference signal transmission, or any combination thereof.

In some examples, the DCI component 1120 may configure two or more DCI formats at a UE. In some examples, the DCI component 1120 may format a control information portion of a first DCI transmission according to a first DCI format. In some examples, the DCI component 1120 may transmit the first DCI transmission to the UE.

The CRC component 1135 may perform a CRC on the control information portion. In some examples, the CRC component 1135 may apply a first mask to the CRC, the mask selected from two or more masks that are each associated with a corresponding DCI format, where the first mask is associated with the first DCI format. In some examples, the CRC component 1135 may append the masked CRC to the control information portion to generate the first DCI transmission. In some cases, the DCI includes a CRC, and where DCI transmissions for the first feature set are scrambled using a first CRC mask, and DCI transmissions for the second feature set are scrambled using a second CRC mask. In some cases, the first CRC mask includes a radio network temporary identifier (RNTI) of the UE prefixed with a first sequence of bits; and the second CRC mask includes the RNTI of the UE prefixed with a second sequence of bits. In some cases, the first CRC mask corresponds to a radio network temporary identifier (RNTI) of the UE, and the second CRC mask corresponds to the RNTI with at least a subset of bits that are inverted. In some cases, the first mask corresponds to a radio network temporary identifier (RNTI) of the UE with an added prefix to indicate the first DCI format and a second mask corresponds to the RNTI of the UE without the added prefix to indicate a second DCI format. In some cases, the two or more DCI formats have a same size.

The priority manager 1125 may manage priority of services of the UE. In some cases, the DCI transmissions of the first feature set have priority over DCI transmissions of the second feature set when at least a portion of the UE-specific search space and the common search space overlap.

The hashing component 1130 may perform a first hashing function on DCI of the first feature set and a second hashing function on DCI of the second feature set.

The scrambling component 1140 may perform scrambling on DCI transmissions. In some cases, the indication that that the DCI transmission corresponds to the first feature set or the second feature set is based on a scrambling sequence used to scramble the DCI.

The BWP manager 1145 may manage one or more BWPs for the UE. In some cases, the indication that the DCI transmission corresponds to the first feature set or the second feature set is based on a bandwidth part used to transmit the DCI.

Figure 12:
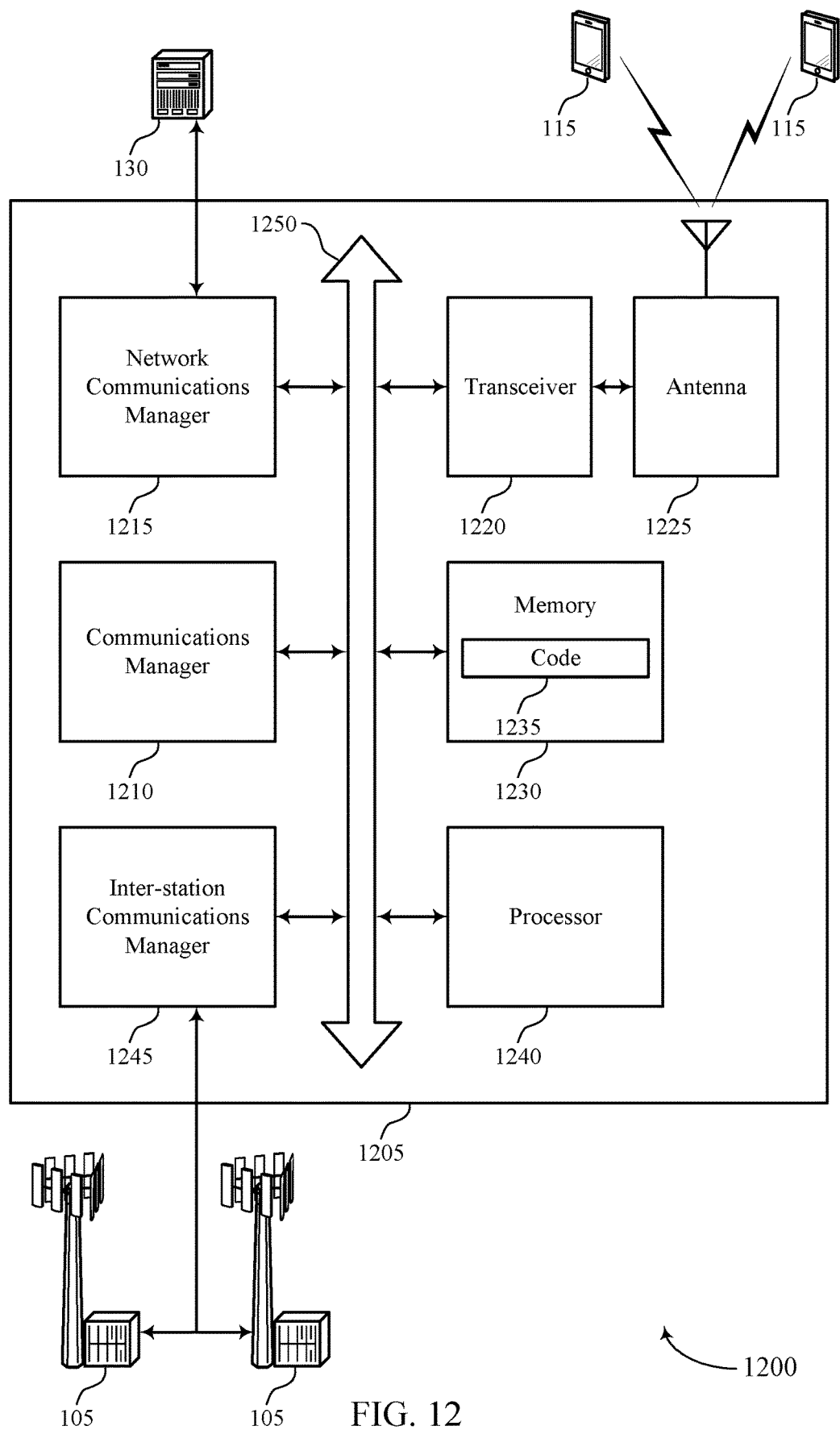
FIG. 12 shows a diagram of a system including a device that supports service and format indication techniques for downlink control information in accordance with aspects of the present disclosure.

FIG. 12 shows a diagram of a system 1200 including a device 1205 that supports service and format indication techniques for downlink control information in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive, from a UE, a signal that the UE is capable of supporting a first feature set and a second feature set, allocate resources for a transmission of the first feature set, and transmit a DCI transmission to the UE that provides the allocated resources for the transmission of the first feature set, where the DCI transmission indicates to the UE whether an associated operation will be for the first feature set or the second feature set, and where DCI associated with the first feature set has a same size as DCI associated with the second feature set. The communications manager 1210 may also configure two or more DCI formats at a UE, format a control information portion of a first DCI transmission according to a first DCI format, transmit the first DCI transmission to the UE, perform a CRC on the control information portion, apply a first mask to the CRC, the mask selected from two or more masks that are each associated with a corresponding DCI format, where the first mask is associated with the first DCI format, and append the masked CRC to the control information portion to generate the first DCI transmission.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device to perform various functions (e.g., functions or tasks supporting service and format indication techniques for downlink control information).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
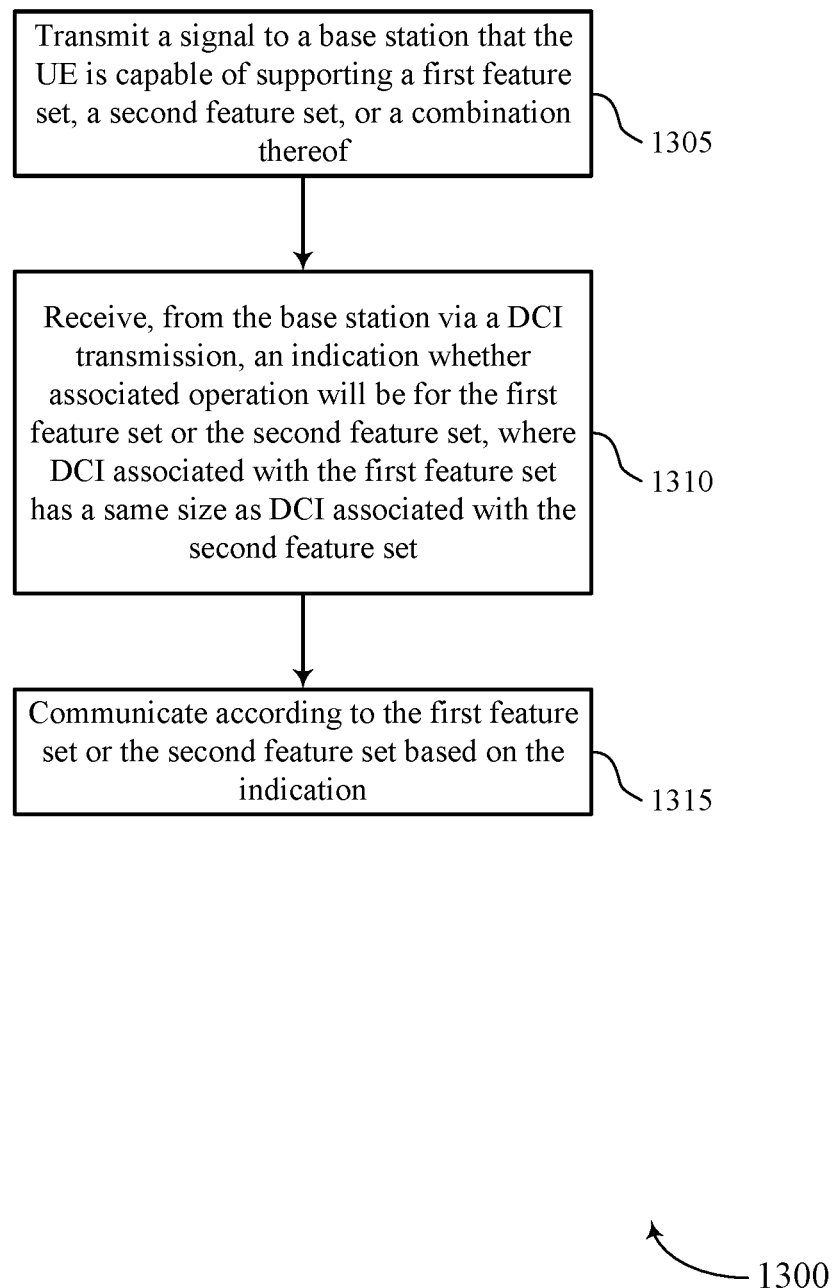
FIGS. 13 through 18 show flowcharts illustrating methods that support service and format indication techniques for downlink control information in accordance with aspects of the present disclosure.

FIG. 13 shows a flowchart illustrating a method 1300 that supports service and format indication techniques for downlink control information in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may transmit a signal to a base station that the UE is capable of supporting a first feature set, a second feature set, or a combination thereof. The operations of 1305 may be performed according to the methods described herein. In some examples, aspects of the operations of 1305 may be performed by a capability component as described with reference to FIGS. 5 through 8.

At 1310, the UE may receive, from the base station via a DCI transmission, an indication whether an associated operation will be for the first feature set or the second feature set, where DCI associated with the first feature set has a same size as DCI associated with the second feature set. The operations of 1310 may be performed according to the methods described herein. In some examples, aspects of the operations of 1310 may be performed by a DCI component as described with reference to FIGS. 5 through 8.

At 1315, the UE may communicate according to the first feature set or the second feature set based on the indication. The operations of 1315 may be performed according to the methods described herein. In some examples, aspects of the operations of 1315 may be performed by a wireless service manager as described with reference to FIGS. 5 through 8.

Figure 14:
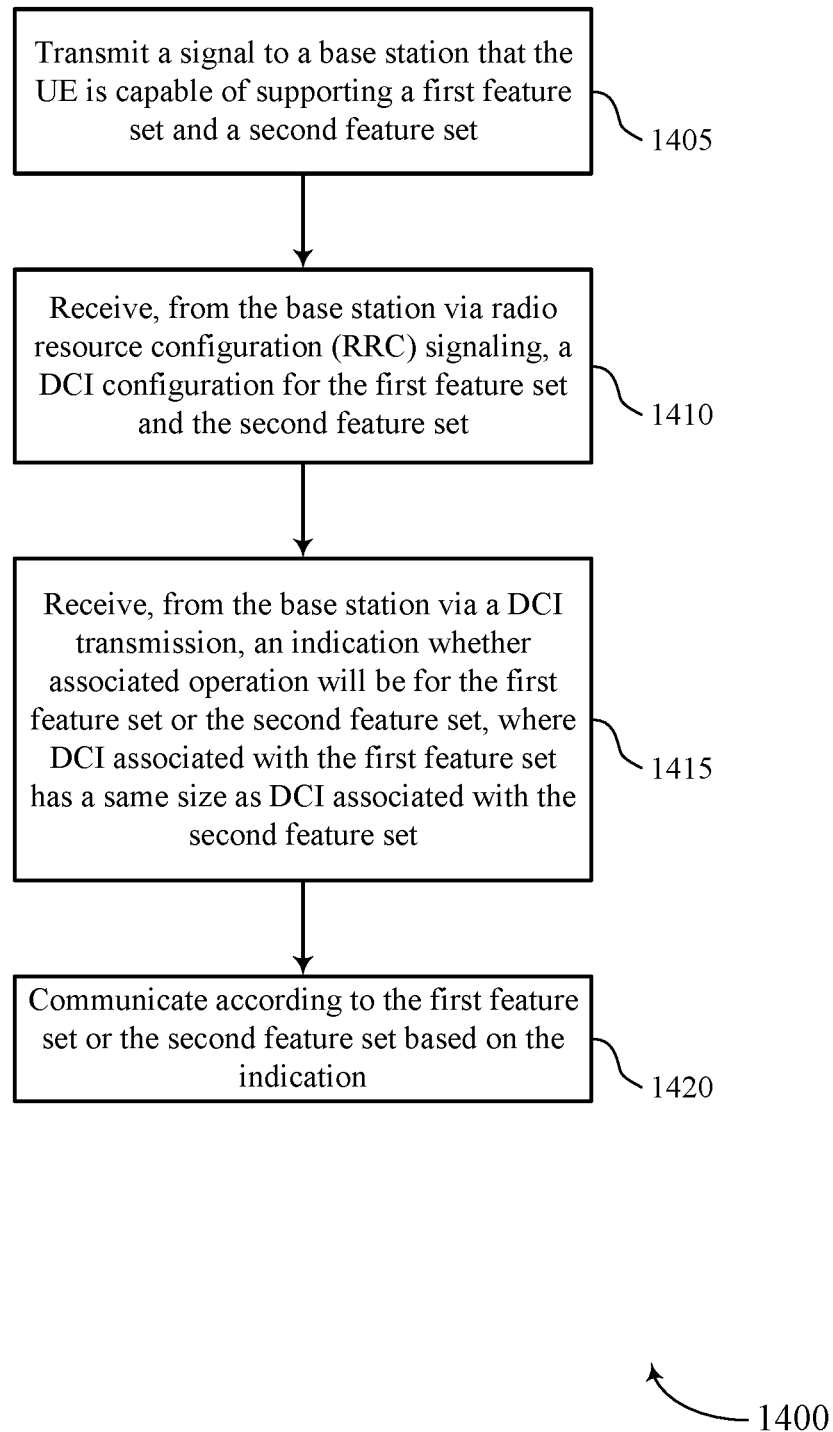

FIG. 14 shows a flowchart illustrating a method 1400 that supports service and format indication techniques for downlink control information in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may transmit a signal to a base station that the UE is capable of supporting a first feature set and a second feature set. The operations of 1405 may be performed according to the methods described herein. In some examples, aspects of the operations of 1405 may be performed by a capability component as described with reference to FIGS. 5 through 8.

At 1410, the UE may receive, from the base station via radio resource configuration (RRC) signaling, a DCI configuration for the first feature set and the second feature set. The operations of 1410 may be performed according to the methods described herein. In some examples, aspects of the operations of 1410 may be performed by a DCI component as described with reference to FIGS. 5 through 8.

At 1415, the UE may receive, from the base station via a DCI transmission, an indication whether an associated operation will be for the first feature set or the second feature set, where DCI associated with the first feature set has a same size as DCI associated with the second service. The operations of 1415 may be performed according to the methods described herein. In some examples, aspects of the operations of 1415 may be performed by a DCI component as described with reference to FIGS. 5 through 8.

At 1420, the UE may communicate according to the first feature set or the second feature set based on the indication. The operations of 1420 may be performed according to the methods described herein. In some examples, aspects of the operations of 1420 may be performed by a wireless service manager as described with reference to FIGS. 5 through 8.

Figure 15:
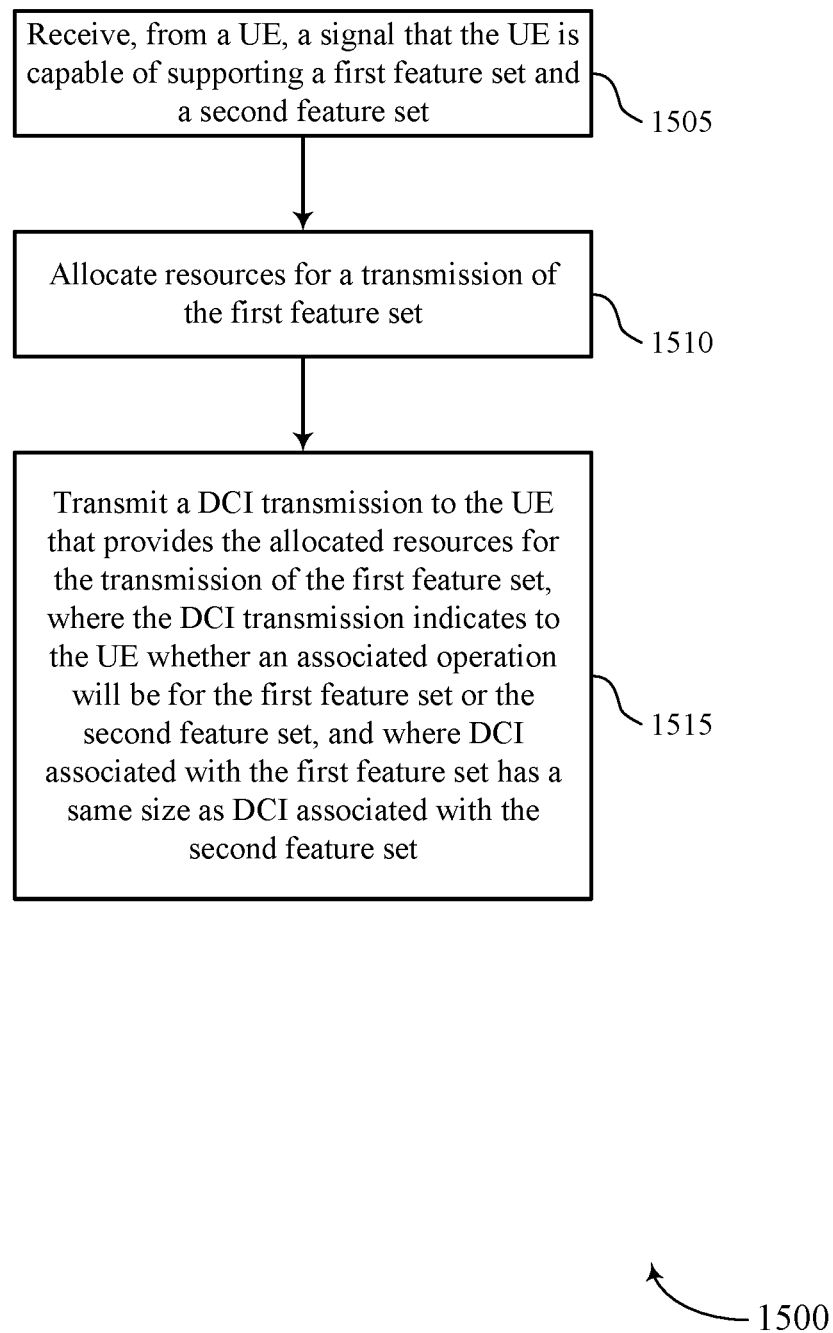

FIG. 15 shows a flowchart illustrating a method 1500 that supports service and format indication techniques for downlink control information in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may receive, from a UE, a signal that the UE is capable of supporting a first feature set and a second feature set. The operations of 1505 may be performed according to the methods described herein. In some examples, aspects of the operations of 1505 may be performed by a capability component as described with reference to FIGS. 9 through 12.

At 1510, the base station may allocate resources for a transmission of the first feature set. The operations of 1510 may be performed according to the methods described herein. In some examples, aspects of the operations of 1510 may be performed by a wireless service manager as described with reference to FIGS. 9 through 12.

At 1515, the base station may transmit a DCI transmission to the UE that provides the allocated resources for the transmission of the first feature set, where the DCI transmission indicates to the UE whether an associated operation will be for the first feature set or the second feature set, and where DCI associated with the first feature set has a same size as DCI associated with the second feature set. The operations of 1515 may be performed according to the methods described herein. In some examples, aspects of the operations of 1515 may be performed by a DCI component as described with reference to FIGS. 9 through 12.

Figure 16:
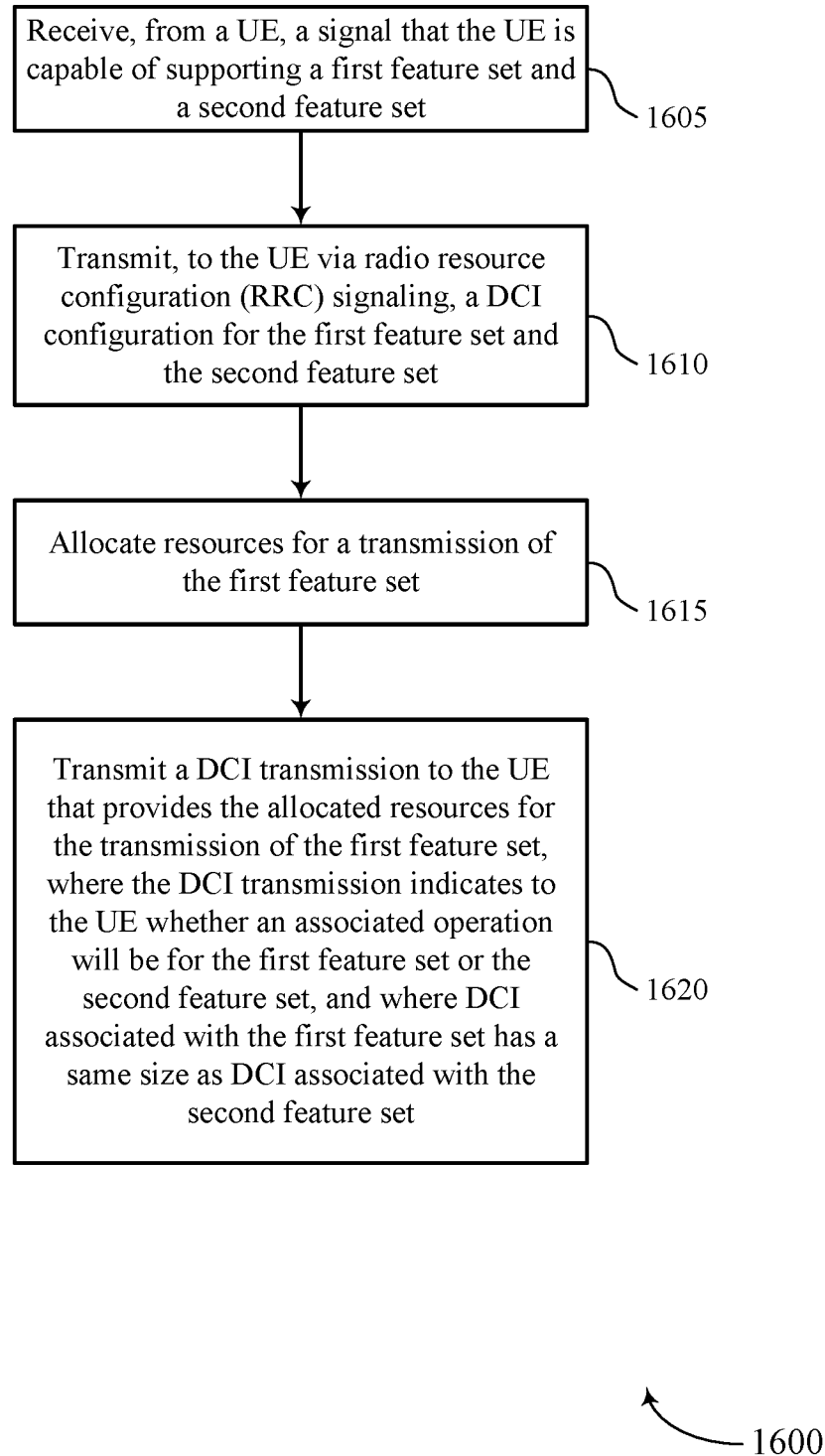

FIG. 16 shows a flowchart illustrating a method 1600 that supports service and format indication techniques for downlink control information in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may receive, from a UE, a signal that the UE is capable of supporting a first feature set and a second feature set. The operations of 1605 may be performed according to the methods described herein. In some examples, aspects of the operations of 1605 may be performed by a capability component as described with reference to FIGS. 9 through 12.

At 1610, the base station may transmit, to the UE via radio resource configuration (RRC) signaling, a DCI configuration for the first feature set and the second feature set. The operations of 1610 may be performed according to the methods described herein. In some examples, aspects of the operations of 1610 may be performed by a DCI component as described with reference to FIGS. 9 through 12.

At 1615, the base station may allocate resources for a transmission of the first feature set. The operations of 1615 may be performed according to the methods described herein. In some examples, aspects of the operations of 1615 may be performed by a wireless service manager as described with reference to FIGS. 9 through 12.

At 1620, the base station may transmit a DCI transmission to the UE that provides the allocated resources for the transmission of the first feature set, where the DCI transmission indicates to the UE whether an associated operation will be for the first feature set or the second feature set, and where DCI associated with the first feature set has a same size as DCI associated with the second feature set. The operations of 1620 may be performed according to the methods described herein. In some examples, aspects of the operations of 1620 may be performed by a DCI component as described with reference to FIGS. 9 through 12.

Figure 17:
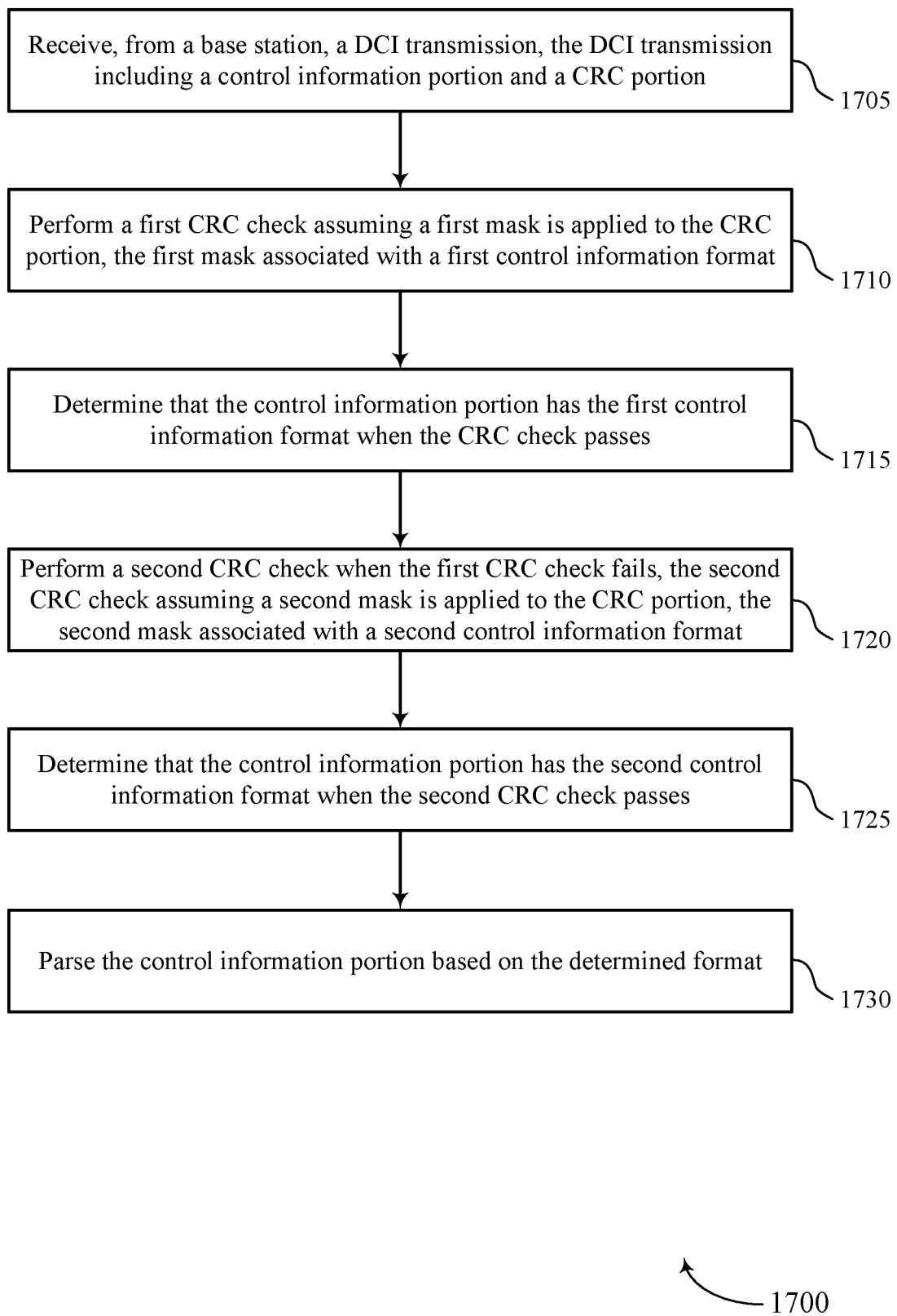

FIG. 17 shows a flowchart illustrating a method 1700 that supports service and format indication techniques for downlink control information in accordance with aspects of the present disclosure. The operations of method 1700 may be implemented by a UE 115 or its components as described herein. For example, the operations of method 1700 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, a DCI transmission, the DCI transmission including a control information portion and a CRC portion. The operations of 1705 may be performed according to the methods described herein. In some examples, aspects of the operations of 1705 may be performed by a DCI component as described with reference to FIGS. 5 through 8.

At 1710, the UE may perform a first CRC check assuming a first mask is applied to the CRC portion, the first mask associated with a first control information format. The operations of 1710 may be performed according to the methods described herein. In some examples, aspects of the operations of 1710 may be performed by a CRC component as described with reference to FIGS. 5 through 8.

At 1715, the UE may determine that the control information portion has the first control information format when the CRC check passes. The operations of 1715 may be performed according to the methods described herein. In some examples, aspects of the operations of 1715 may be performed by a CRC component as described with reference to FIGS. 5 through 8.

At 1720, the UE may perform a second CRC check when the first CRC check fails, the second CRC check assuming a second mask is applied to the CRC portion, the second mask associated with a second control information format. The operations of 1720 may be performed according to the methods described herein. In some examples, aspects of the operations of 1720 may be performed by a CRC component as described with reference to FIGS. 5 through 8.

At 1725, the UE may determine that the control information portion has the second control information format when the second CRC check passes. The operations of 1725 may be performed according to the methods described herein. In some examples, aspects of the operations of 1725 may be performed by a CRC component as described with reference to FIGS. 5 through 8.

At 1730, the UE may parse the control information portion based on the determined format. The operations of 1730 may be performed according to the methods described herein. In some examples, aspects of the operations of 1730 may be performed by a DCI parsing component as described with reference to FIGS. 5 through 8.

Figure 18:
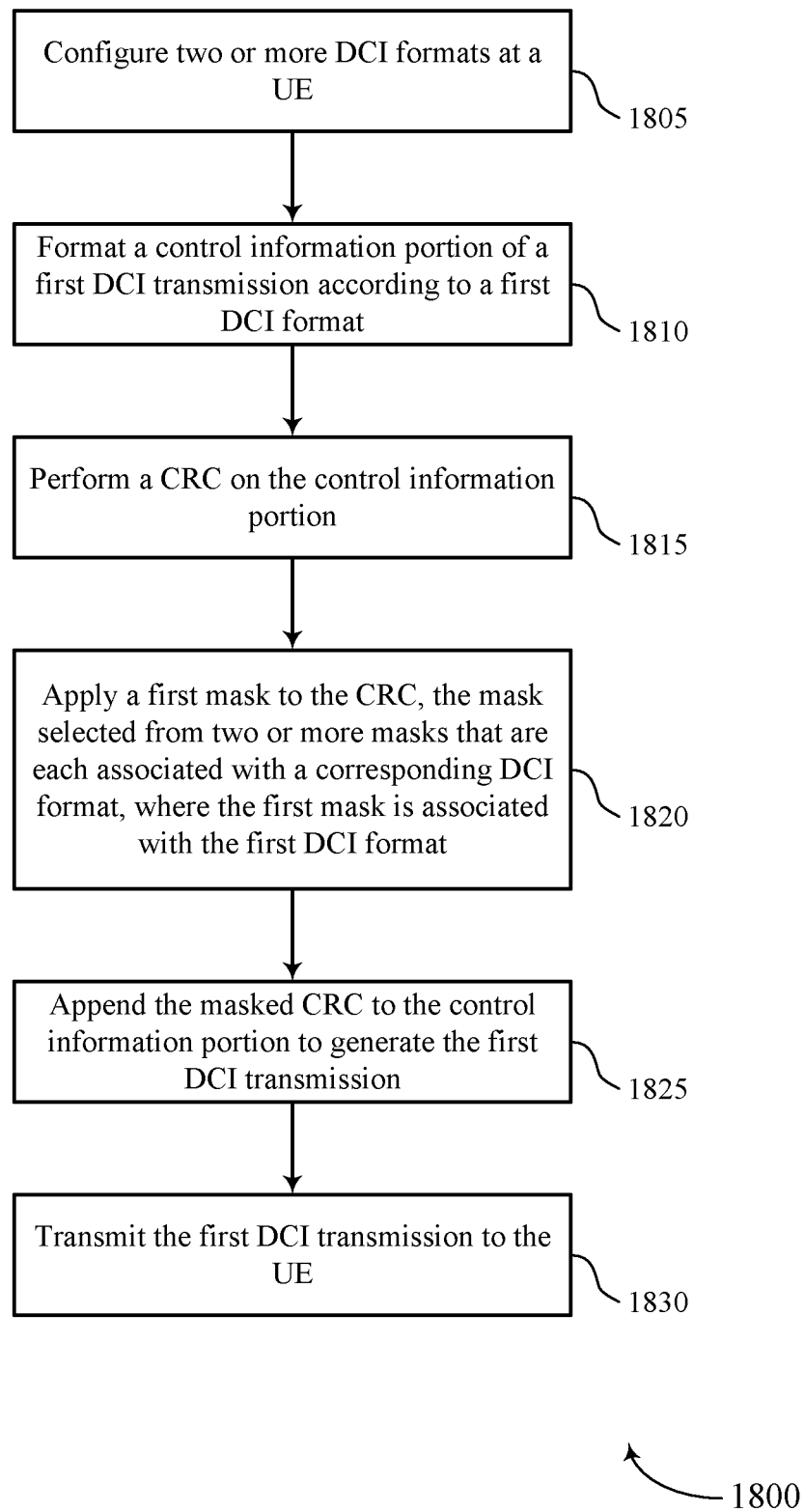

FIG. 18 shows a flowchart illustrating a method 1800 that supports service and format indication techniques for downlink control information in accordance with aspects of the present disclosure. The operations of method 1800 may be implemented by a base station 105 or its components as described herein. For example, the operations of method 1800 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may configure two or more DCI formats at a UE. The operations of 1805 may be performed according to the methods described herein. In some examples, aspects of the operations of 1805 may be performed by a DCI component as described with reference to FIGS. 9 through 12.

At 1810, the base station may format a control information portion of a first DCI transmission according to a first DCI format. The operations of 1810 may be performed according to the methods described herein. In some examples, aspects of the operations of 1810 may be performed by a DCI component as described with reference to FIGS. 9 through 12.

At 1815, the base station may perform a CRC on the control information portion. The operations of 1815 may be performed according to the methods described herein. In some examples, aspects of the operations of 1815 may be performed by a CRC component as described with reference to FIGS. 9 through 12.

At 1820, the base station may apply a first mask to the CRC, the mask selected from two or more masks that are each associated with a corresponding DCI format, where the first mask is associated with the first DCI format. The operations of 1820 may be performed according to the methods described herein. In some examples, aspects of the operations of 1820 may be performed by a CRC component as described with reference to FIGS. 9 through 12.

At 1825, the base station may append the masked CRC to the control information portion to generate the first DCI transmission. The operations of 1825 may be performed according to the methods described herein. In some examples, aspects of the operations of 1825 may be performed by a CRC component as described with reference to FIGS. 9 through 12.

At 1830, the base station may transmit the first DCI transmission to the UE. The operations of 1830 may be performed according to the methods described herein. In some examples, aspects of the operations of 1830 may be performed by a DCI component as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
transmitting, from a user equipment (UE), a signal to a base station that the UE is capable of supporting a first feature set comprising a first priority and a second feature set comprising a second priority;
receiving, from the base station via a downlink control information (DCI) transmission, an indication whether an associated operation will be for the first priority or the second priority;
determining whether data for the associated operation is to be multiplexed with data of another operation based at least in part on the indication; and
communicating according to the first priority or the second priority based at least in part on the indication and the determining.

2. The method of claim 1, wherein the first feature set and the second feature set have different reliability targets, different latency targets, different feedback acknowledgment timelines, different shared channel scheduling timelines, different channel state information (CSI) reporting timelines, different target block error rates (BLER) for CSI computation, or any combination thereof.

3. The method of claim 1, wherein the first feature set is associated with an ultra-reliable low-latency communication (URLLC) service and the second feature set is associated with is an enhanced mobile broadband (eMBB) service.

4. The method of claim 1, wherein the first feature set and the second feature set have separate radio resource control (RRC) configurations for uplink transmission, downlink semi-persistent scheduling (SPS) transmissions, or combinations thereof.

5. The method of claim 4, wherein the RRC configurations for uplink transmissions comprise a grant Type 1 configuration, a grant Type 2 configuration, or combinations thereof.

6. The method of claim 1, further comprising:
receiving, from the base station via radio resource configuration (RRC) signaling, a DCI configuration for the first feature set and the second feature set.

7. The method of claim 1, wherein the DCI transmission includes an indication field having a value that indicates whether the associated operation will be for the first feature set or the second feature set.

8. The method of claim 7, wherein the indication field is a one bit indicator.

9. The method of claim 7, further comprising:
receiving, from the base station, a DCI configuration that semi-statically configures for UE to monitor for the indication field.

10. The method of claim 7, wherein a first subset of occasions for monitoring for DCI are in a UE-specific search space and a second subset of occasions for monitoring for DCI are in a common search space, and wherein the indication field is configured for DCI transmissions in the UE-specific search space, and wherein DCI transmissions in the common search space are associated only with one of the first feature set or the second feature set and do not include the indication field.

11. The method of claim 7, wherein the UE monitors for DCI in a set of monitoring occasions and DCI transmissions that include the indication field are configured in a first subset of monitoring occasions, and wherein other DCI transmissions outside of the first subset of monitoring occasions are associated only with one of the first feature set or the second feature set and do not include the indication field.

12. The method of claim 1, wherein the receiving comprises:
monitoring for DCI in a set of monitoring occasions, and wherein the indication whether the associated operation is for the first feature set or the second feature set is based on whether the DCI transmission is in a first subset of the set of monitoring occasions associated with the first feature set or in a second subset of the set of monitoring occasions associated with the second feature set.

13. The method of claim 1, wherein the receiving comprises:
monitoring a UE-specific search space and a common search space for DCI transmissions, and wherein DCI transmissions for the first feature set are provided in the UE-specific search space and DCI transmissions for the second feature set are provided in the common search space.

14. The method of claim 13, wherein, when at least a portion of the UE-specific search space and the common search space overlap, the DCI transmissions of the first feature set have priority over DCI transmissions of the second feature set, the DCI transmissions of the second feature set have priority over DCI transmissions of the first feature set, or the base station may configure which of the first feature set or the second feature set DCI has priority.

15. The method of claim 1, wherein the receiving comprises:
attempting to decode the DCI using a first hashing function and a second hashing function, and wherein the first feature set has DCI with the first hashing function and the second feature set has DCI with the second hashing function, and overlapping portions of the first hashing function and the second hashing function may be associated with the first feature set, the second feature set, or a feature set as configured by the base station.

16. The method of claim 1, wherein a first subset of candidate wireless resource locations is associated with DCI of the first feature set and a second subset of candidate wireless resources locations is associated with DCI of the second feature set.

17. The method of claim 1, wherein the DCI includes a cyclic redundancy check (CRC), and wherein the receiving comprises:
determining that the DCI transmission is for the first feature set based at least in part on successfully decoding the CRC using a first CRC mask; and
determining that the DCI transmission is for the second feature set based at least in part on successfully decoding the CRC using a second CRC mask.

18. The method of claim 17, wherein the first CRC mask comprises a radio network temporary identifier (RNTI) of the UE prefixed with a first sequence of bits, and the second CRC mask comprises the RNTI of the UE prefixed with a second sequence of bits; or
wherein the first sequence of bits is all zeros.

19. The method of claim 17, wherein the first CRC mask corresponds to a radio network temporary identifier (RNTI) of the UE, and the second CRC mask corresponds to the RNTI with at least a subset of bits that are inverted.

20. The method of claim 1, wherein the receiving comprises:
determining that the DCI transmission corresponds to the first feature set or the second feature set based at least in part on a scrambling sequence used to scramble the DCI or a demodulation reference signal (DMRS).

21. The method of claim 1, wherein the receiving comprises:
determining that the DCI transmission corresponds to the first feature set or the second feature set based at least in part on a bandwidth part used to transmit the DCI.

22. A method for wireless communications at a user equipment (UE), comprising:
receiving, from a base station via a downlink control information (DCI) transmission, an indication of whether an uplink transmission will be for a first feature set comprising a first priority or a second feature set comprising a second priority that are configured at the UE;
determining that first uplink data of the first feature set and second uplink data of the second feature set are to be transmitted to the base station; and
multiplexing the first uplink data and the second uplink data into the uplink transmission, wherein the multiplexing is based at least in part on whether the uplink transmission is for the first feature set or the second feature set, the first priority of the first feature set relative to the second priority of the second feature set, an amount of data that can be transmitted via the uplink transmission relative to an amount of the first uplink data or the second uplink data, or any combination thereof.

23. The method of claim 22, wherein the first feature set is associated with an ultra-reliable low-latency communication (URLLC) service and the second feature set is associated with an enhanced mobile broadband (eMBB) service, and wherein the multiplexing comprises multiplexing the first uplink data with a higher priority than the second uplink data when the uplink transmission is for the first feature set.

24. The method of claim 23, wherein multiplexing further comprises:
multiplexing the first uplink data and the second uplink data based on one or more flow control parameters associated with the first feature set and the second feature set.

25. The method of claim 24, wherein the one or more flow control parameters include a token arrival rate and a bucket size of a token-bucket flow controller.

26. The method of claim 23, wherein, when the uplink transmission is for the second feature set, the multiplexing comprises:
determining that a coding rate for the uplink transmission is below a threshold value; and
multiplexing, based at least in part on the determining, the first uplink data and the second uplink data based on one or more flow control parameters associated with the first feature set and the second feature set.

27. An apparatus for wireless communication, comprising:
a processor;
memory in electronic communication with the processor; and
instructions stored in the memory and executable by the processor to cause the apparatus to:
transmit, from a user equipment (UE), a signal to a base station that the UE is capable of supporting a first feature set comprising a first priority and a second feature set comprising a second priority;
receive, from the base station via a downlink control information (DCI) transmission, an indication whether an associated operation will be for the first priority or the second priority;

determining whether data for the associated operation is to be multiplexed with data of another operation based at least in part on the indication; and communicate according to the first priority or the second priority based at least in part on the indication and the determining.

28. An apparatus for wireless communications at a user equipment (UE), comprising:

a processor;

memory in electronic communication with the processor; and instructions stored in the memory and executable by the processor to cause the apparatus to:

receive, from a base station via a downlink control information (DCI) transmission, an indication of whether an uplink transmission will be for a first feature set comprising a first priority or a second feature set comprising a second priority that are configured at the UE;

determine that first uplink data of the first feature set and second uplink data of the second feature set are to be transmitted to the base station; and multiplex the first uplink data and the second uplink data into the uplink transmission, wherein the multiplexing is based at least in part on whether the uplink transmission is for the first feature set or the second feature set, the first priority of the first feature set relative to the second priority of the second feature set, an amount of data that can be transmitted via the uplink transmission relative to an amount of the first uplink data or the second uplink data, or any combination thereof.

29. The method of claim 1, wherein receiving the indication of whether the associated operation will be for the first priority or the second priority comprises:

receiving the DCI transmission that includes an indication field having a value that indicates that the associated operation will be for the first priority or the second priority.

* * * * *